United States Patent
Kanamaru et al.

(10) Patent No.: US 6,913,834 B2
(45) Date of Patent: *Jul. 5, 2005

(54) POLYOLEFIN RESIN COMPOSITION, FILM, AND MULTILAYER STRUCTURE

(75) Inventors: Masami Kanamaru, Chiba (JP); Yutaka Minami, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/472,481

(22) PCT Filed: Mar. 25, 2002

(86) PCT No.: PCT/JP02/02853

§ 371 (c)(1),
(2), (4) Date: Sep. 29, 2003

(87) PCT Pub. No.: WO02/079321

PCT Pub. Date: Oct. 10, 2002

(65) Prior Publication Data

US 2004/0096682 A1 May 20, 2004

(30) Foreign Application Priority Data

Mar. 29, 2001 (JP) .......................................... 2001-95315
Nov. 12, 2001 (JP) ......................................... 2001-345912

(51) Int. Cl.$^7$ .......................... B32B 27/32; C08L 23/10; C08L 23/20
(52) U.S. Cl. ....................... 428/523; 428/515; 428/516; 525/240
(58) Field of Search .................................. 428/515, 516, 428/523; 525/240

(56) References Cited

FOREIGN PATENT DOCUMENTS

| EP | 564206 | 10/1993 |
|---|---|---|
| JP | 61-108646 | 5/1986 |
| JP | 61-108647 | 5/1986 |
| JP | 61-50974 | 11/1986 |
| JP | 4-359029 | 12/1992 |
| JP | 11-245355 | 9/1999 |
| JP | 2000-80225 | 3/2000 |

*Primary Examiner*—D. S. Nakarani
(74) *Attorney, Agent, or Firm*—Oblon, Spivak, McClelland, Maier & Neustadt, P.C.

(57) ABSTRACT

A polyolefin base resin composition (A) comprising [I] a 1-butene base polymer in an amount of 1 to 99% by weight, [II] a propylene base resin in an amount of 99 to 1% by weight and a nucleus-forming agent in an amount of 10 ppm or more, wherein [I] the 1-butene base polymer satisfies the requirements of a melting point, a stereospecific index, a molecular weight distribution and a weight average molecular weight. The polyolefin base resin composition (A) provides a film which is excellent in a flexibility and an impact resistance and which rises in a crystal stabilizing rate, and the multilayer laminate in which at least one of outermost layers is constituted from a polyolefin resin composition (B) provides a multilayer film which is improved in a low temperature heat sealing property and a hot tacking property making the best use of an excellent characteristic of crystalline polyolefin.

8 Claims, No Drawings

POLYOLEFIN RESIN COMPOSITION, FILM, AND MULTILAYER STRUCTURE

FIELD OF THE INVENTION

The present invention relates to a polyolefin base resin composition having an excellent secondary processability and a molded article thereof. More specifically, the invention relates to a polyolefin base resin composition, a film and a multilayer laminate film that is less sticky and excellent in an impact resistance, moldability and a secondary processability.

RELATED ART

Crystalline polyolefin is widely used for a packaging film making the best use of excellent rigidity, transparency and moisture proofing property thereof. Regardless of multilayer and single layer forms, a packaging film is often processed in the form of a bag, and a series of operations in which a film is processed and filled with a content and in which a bag opening is then closed is carried out usually by an operation called heat sealing in which the films themselves are molten and adhered by pressing them by means of a heated bar. In recent years, a speed is accelerated in a series of these bag making and packaging steps in order to enhance productivity, and a material having an excellent heat sealing property is strongly desired to be developed. Further, in order to smoothly carry out these secondary processing steps, a slipping property, an anti-blocking property and a hot tacking property are required to the film as essential characteristics.

Pressing at a high temperature for long time is required for heat-sealing a film of a propylene homopolymer, and copolymerization of propylene with ethylene, 1-butene and other α-olefins has so far widely been carried out for the purpose of improving this defect. However, a large amount of a comonomer such as ethylene, 1-butene and other α-olefins has to be copolymerized in order to obtain a satisfactory improving effect for a heat sealing property. Further, in this case, these comonomers are sometimes present mainly in low molecular weight components and cause a sticky component that is short of crystallinity. This brings about blocking, deteriorates a hot tacking property to bring about troubles on secondary processing and causes poor appearance due to bleed whitening, and therefore the film can not stand practical use. Further, it has been tried to dissolve such sticky component in an inert solvent to remove it, but it is very difficult to efficiently wash away the sticky component and inhibit a low temperature-melting component which contributes to a heat sealing property from being reduced by washing.

Further, a 1-butene base polymer has the characteristics that it is tough and excellent in a heat resistance, and therefore it is used for a wide variety of applications as a general-purpose resin.

For example, the 1-butene base polymers has the characteristics that it is extremely transparent and tough and has a heat resistance and less hygroscopicity, and therefore it is used as a cast film such as a biaxially stretched film and a laminate film. A crystalline 1-butene base polymer film is widely used as a packaging film making the best use of excellent rigidity, transparency and moisture proofing property thereof.

However, a 1-butene base polymer film has a large supercooling degree required for starting crystallization and a low crystallizing temperature although the melting point is the same in comparison with an ethylene base polymer. In the case of the 1-butene base polymers having a low crystallinity, they are particularly marked. This has brought about the inconveniences on the product that molding thereof is difficult and the low temperature heat sealing property, the elastic modulus and the impact resistance are reduced and that these resin characteristics change with the passage of time.

On the other hand, a 1-butene polymer has so far been produced using a magnesium-carrying type titanium catalyst (Japanese Patent Application Laid-Open No. 145205/1995), and adverse effects such as heterogeneity of the composition, generation of stickiness and a reduction in the transparency have been exerted on the physical properties.

In respect to this regard, 1-butene polymers having a homogeneous composition have been obtained using a metallocene catalyst in recent years (Japanese Patent Application Laid-Open No. 119214/1987, Japanese Patent Application Laid-Open No. 121708/1987, Japanese Patent Application Laid-Open No. 121707/1987, Japanese Patent Application Laid-Open No. 119213/1987 and Japanese Patent Application Laid-Open No. 225605/1996).

However, homopolymers disclosed in these related arts have a high stereospecific property and is lacking in flexibility.

Accordingly, copolymers of 1-butene with other α-olefins are proposed in order to elevate flexibility. However, even when a metallocene catalyst is used, the composition distribution is broadened in a certain case in the case of a mere 1-butene base copolymer, and it has been impossible to effectively prevent crystal modification, generation of stickiness and a reduction in transparency.

In light of the situation described above, an object of the present invention is to provide a polyolefin base resin composition which is excellent in transparency and flexibility and improved in a crystal stabilizing rate, a film comprising the above polyolefin base resin composition and a multilayer film which is improved in a low temperature heat sealing property and a hot tacking property while making the best use of the excellent characteristics of crystalline polyolefin.

DISCLOSURE OF THE INVENTION

Intensive researches repeated by the present inventors in order to achieve the purpose described above have resulted in finding that a composition (A) obtained by adding a propylene base resin and a nucleus-forming agent to a 1-butene base polymer in which (1) a melting point, (2) a stereospecific index [(mmmm)/(mmrr+rmmr)], (3) a molecular weight distribution (Mw/Mn) and (4) a weight average molecular weight (Mw) fall in the specific ranges is a polyolefin base resin composition which provides a molded article having excellent flexibility, impact resistance and secondary processability and which is improved in a crystal stabilizing rate; the above composition provides a film which is excellent in a balance between a rigidity and a heat sealing temperature in heat sealing and which has less change in the heat sealing temperature with the passage of time. Further, they have also found that a polyolefin resin (B) constituted from the above 1-butene base polymer and a crystalline polypropylene base resin is used for at least one of outermost layers in a multilayer laminate, whereby a multilayer film having an excellent hot tacking property although a heat sealing temperature is low is obtained, and thus they have come to complete the present invention.

That is, the present invention provides a polyolefin base resin composition (A), a film and a multilayer laminate each shown below.

[1] A polyolefin base resin composition (A) comprising [I] a 1-butene base polymer in an amount of 1 to 99% by weight, [II] a propylene base resin in an amount of 99 to 1% by weight and a nucleus-forming agent in an amount of 10 ppm or more, wherein [I] the 1-butene base polymer satisfies the following requirements (1) to (4):

(1) It is a crystalline resin having a melting point (TmD) of 0 to 100° C. defined as a peak top in a peak observed at the highest temperature side in a melt endothermic curve which is obtained by holding a sample at −10° C. for 5 minutes under nitrogen atmosphere by means of a differential scanning type calolimeter (DSC) and then elevating the temperature with 10° C./minute;

(2) a stereospecific index [(mmmm)/(mmrr+rmmr)] is 20 or less;

(3) a molecular weight distribution (Mw/Mn) determined by gel permeation chromatograph (GPC) is 4.0 or less; and (4) a weight average molecular weight (Mw) determined by GPC is 10,000 to 1,000,000.

[2] A film obtained by molding the polyolefin base resin composition (A) as described in the above item [1].

[3] The film as described in the above item [2] satisfying the following requirements (1) to (2):

(1) A relation between a tensile elastic modulus TM (MPa) of the film and a heat-sealing temperature $HST^1$ (° C.) measured about the film after aging for a whole day and night in accordance with JIS Z-1707 satisfies the following equation:

$$TM \geq 12.5 \times HST^1 - 1100;\ and$$

(2) a relation between the heat sealing temperature $HST^1$ (° C.) measured about the film after aging for a whole day and night and an aged heat sealing temperature $HST^{30}$ (° C.) measured about the film after aging for 30 days satisfies the following equation:

$$HST^{30} - HST^1 \leq 5.$$

[4] A multilayer laminate obtained by molding the polyolefin base resin composition (A) as described in the above item [1].

[5] A multilayer laminate in which at least one of outermost layers is constituted from a polyolefin resin composition (B) comprising [I] a 1-butene base polymer in an amount of 1 to 99% by weight and [II] a crystalline propylene base resin in an amount of 99 to 1% by weight, wherein [I] the 1-butene base polymer satisfies the following requirements (1') to (4):

(1') It is a crystalline resin in which a melting point (TmP) defined as a peak top in a peak observed at the highest temperature side in a melt endothermic curve which is obtained by melting a sample at 190° C. for 5 minutes under nitrogen atmosphere by means of a differential scanning type calolimeter (DSC), lowering the temperature down to −10° C. with 5° C./minute to hold at −10° C. for 5 minutes and then elevating the temperature with 10° C./minute is not observed or within 0 to 100° C.;

(2) a stereospecific index [(mmmm)/(mmrr+rmmr)] is 20 or less;

(3) a molecular weight distribution (Mw/Mn) determined by gel permeation chromatograph (GPC) is 4.0 or less; and (4) a weight average molecular weight (Mw) determined by GPC is 10,000 to 1,000,000.

[6] The multilayer laminate as described in the above item [5], wherein [I] the 1-butene base polymer is a 1-butene homopolymer, and the above homopolymer satisfies the following requirements (5) and (6):

(5) A mesopentad ratio (mmmm) is 20 to 90%; and (6) (mmmm)≦90−2×(rr); provided that rr represents a racemitriad ratio.

[7] The multilayer laminate as described in the above item [5] or [6], wherein the polyolefin resin composition (B) in at least one of the outermost layers satisfies the following equation:

$$TH < 1.29 \times HST - 54.5;$$

provided that TH represents a hot tacking temperature (° C.) and HST represents a heat sealing temperature (° C.).

BEST MODE FOR CARRYING OUT THE INVENTION

[1] The 1-butene base polymer, [2] a production process for the 1-butene base polymer, [3] the polyolefin base resin composition (A), [4] the film, [5] the crystalline polypropylene polymer, [6] the polyolefin resin composition (B) and [7] the multilayer laminate shall be explained below in detail in order.

[1] 1-Butene Base Polymer

The 1-butene base polymer used in the present invention includes a 1-butene homopolymer obtained by homopolymerizing 1-butene and a 1-butene copolymer obtained by copolymerizing 1-butene with ethylene and α-olefins having 3 to 20 carbon atoms (excluding 1-butene), and the 1-butene homopolymer is suitably used.

The α-olefins other than 1-butene which constitute the 1-butene base copolymer include ethylene, propylene, 1-pentene, 4-methyl-1-pentene, 1-hexene, 1-octene, 1-decene, 1-dodecene, 1-tetracene, 1-hexadecene, 1-octadecene and 1-eicocene, and at least one of them can be used.

The 1-butene base copolymer in the present invention is preferably a random copolymer. A structural unit obtained from 1-butene accounts preferably for 90 mole % or more, more preferably 95 mole % or more and particularly preferably 98 mole % or more. When the structural unit obtained from 1-butene accounts for less than 90 mole %, stickiness on the surface of the molded article and a reduction in the transparency are likely to be caused.

The 1-butene base polymer used in the polyolefin base resin composition (A) of the present invention is a polymer satisfying the following (1) to (4) as requisites:

(1) It is a crystalline resin having a melting point (TmD) of 0 to 100° C. defined as a peak top in a peak observed at the highest temperature side in a melt endothermic curve which is obtained by holding a sample at −10° C. for 5 minutes under nitrogen atmosphere by means of a differential scanning type calolimeter (DSC) and then elevating the temperature with 10° C./minute;

(2) a stereospecific index [(mmmm)/(mmrr+rmmr)] is 20 or less;

(3) a molecular weight distribution (Mw/Mn) determined by gel permeation chromratograph (GPC) is 4.0 or less; and (4) a weight average molecular weight (Mw) determined by GPC is 10,000 to 1,000,000.

The 1-butene base polymers in the present invention is a crystalline compound having substantially at least a melting point. A melting point is observed usually by means of a differential scanning type calolimeter (DSC). In the present invention, having substantially a melting point means that a crystal melt peak is substantially observed in DSC measurement. The crystal melt peak means, for example, TmD described above or TmP described later, and a peak is observed by at least any measuring condition.

The 1-butene base copolymer in the present invention is excellent in a balance between an amount of a sticky component in the resulting molded article and a reduction in the elastic modulus by satisfying the relation described above. That is, it has the advantages that it has a low elastic modulus and is excellent in softness (also referred to as flexibility) and that it has less sticky component and is excellent in a surface characteristic (for example, represented by less bleeding and less transferring of the sticky component to the other products).

The 1-butene base polymer in the polyolefin base resin composition (A) of the present invention is a crystalline compound having a melting point (TmD) of 0 to 100° C., preferably 0 to 80° C.

This melting point (TmD) of the 1-butene base polymer is determined by DSC measurement. That is, a melt endothermic amount obtained by holding 10 mg of a sample at −10° C. for 5 minutes under nitrogen atmosphere by means of a differential scanning type calolimeter (DSC) and then elevating the temperature with 10° C./minute is designated as ΔHD. Further, a peak top in a peak observed at the highest temperature side in a melt endothermic curve obtained in this case is the melting point (TmD).

A melting point (TmP) of the 1-butene base polymer used in the polyolefin resin composition (B) in the multilayer laminate is not observed or within 0 to 100° C., preferably within 0 to 80° C. from the viewpoint of the softness.

This melting point (TmP) of the 1-butene base polymers is determined as well by DSC measurement. That is, a melt endothermic amount which is obtained by melting in advance 10 mg of a sample at 190° C. for 5 minutes under nitrogen atmosphere by means of a differential scanning type calolimeter (DSC), lowering the temperature down to −10° C. with 5° C./minute to hold at −10° C. for 5 minutes and then elevating the temperature with 10° C./minute is designated as ΔH. Further, a peak top in a peak measured at the highest temperature side in a melt endothermic curve obtained in this case is the melting point: TmP (° C.).

The 1-butene base polymer used in the polyolefin resin composition (B) may be a crystalline compound having a melting point (TmD) of 0 to 100° C., preferably 0 to 80° C. from the viewpoint of the softness.

The 1-butene base polymer used in this polyolefin resin composition (B) satisfies as well the requisites (2) to (4) in the 1-butene base polymer used in the polyolefin base resin composition (A), and the same 1-butene base polymer is used.

The 1-butene base polymer used in the present invention is excellent in flexibility and preferred if the melt endothermic amount ΔHD determined by DSC measurement is 50 J/g or less. ΔHD is an index showing whether or not soft, and a large value of this index means that the elastic modulus is high and the softness is reduced.

In the 1-butene base polymer used in the present invention, a stereospecific index [(mmmm)/(mmrr+rmmr)] obtained from a (mmmm) ratio and a (mmrr+rmmr) ratio in a 1-butene chain part is 20 or less, preferably 18 or less and more preferably 15 or less. When the stereospecific index exceeds 20, a reduction in the flexibility, the low temperature heat sealing property and the hot tacking property brings about.

In the 1-butene base polymer used in the present invention, a mesopentad ratio (mmmm) and an abnormal insertional content (1,4 insertional ratio) are determined in accordance with a method proposed in "Macromol. Chem. Phys., 198, 1257 (1997)" reported by V. Busico et al. That is, signals of a methylene group and a methine group are measured by means of a $^{13}C$ nuclear magnetic resonance spectrum to determine a mesopentad ratio and an abnormal insertional content in a poly(1-butene) molecule:

Apparatus: JNM-EX400 type $^{13}C$-NMR apparatus
Method: proton complete decoupling method
Concentration: 220 mg/milliliter
Solvent: 90:10 (volume ratio) mixed solvent of 1,2,4-trichlorobenzene and heavy benzene
Temperature: 130° C.
Pulse width: 45°
Pulse repetition time: 4 seconds
Integration: 10000 times The stereospecific index [(mmmm)/(mmrr+rmmr)] is calculated from a value obtained by measuring (mmmm), (mmrr) and (rmmr) in accordance with the method described above, and the racemitriad ratio (rr) is calculated as well in accordance with the method described above.

In addition to the requisites described above, the 1-butene base polymers in the present invention have a molecular weight distribution (Mw/Mn) of 4.0 or less, preferably 3.5 to 1.5 and more preferably 3.0 to 1.5, which is measured by a GPC method. When the molecular weight distribution (Mw/Mn) exceeds 4.0, stickiness is produced in a certain case, and when it is less than 1.5, the moldability is likely to be deteriorated.

In addition to the requisites described above, the 1-butene base polymer in the present invention has a weight average molecular weight Mw of 10,000 to 1,000,000 which is measured by the GPC method. When the weight average molecular weight Mw is less than 10,000, stickiness is produced in a certain case. On the other hand, when it exceeds 1,000,000, the fluidity is reduced, and therefore the moldability is deteriorated in a certain case.

The molecular weight distribution (Mw/Mn) described above is a value calculated from the weight average molecular weight Mw and the number average molecular weight Mn in terms of polystyrene each measured by means of the following apparatus on the following conditions in accordance with the GPC method.

GPC Measuring Apparatus
  Column: TOSO GMHHR-H (S) HT
  Detector: RI detector WATERS 150C for liquid chromatogram
Measuring Conditions
  Solvent: 1,2,4-trichlorobenzene
  Measuring temperature: 145° C.
  Flow velocity: 1.0 milliliter/minute
  Sample concentration: 2.2 mg/milliliter
  Injected amount: 160 micro liters
  Calibration curve: Universal Calibration
  Analytical program: HT-GPC (Ver. 1.0)

The 1-butene base polymer suitably used in the present invention has a mesopentad ratio (mmmm) of preferably 20 to 90%, more preferably 40 to 85% and most preferably 60 to 80%. When the mesopentad ratio is less than 20%, stickiness on the surface of the molded article and a reduction in the transparency are likely to bring about. On the other hand, when it exceeds 90%, a reduction in the flexibility, the low temperature heat-sealing property and the hot tacking property brings about in a certain case.

Further, the 1-butene base polymer preferably satisfies the relation of "(mmmm)≦90−2×(rr)" and more preferably satisfies the relation of "(mmmm)≦87−2×(rr)2. When this relation is not satisfied, stickiness on the surface of the molded article and a reduction in the transparency likely to bring about.

Further, the above 1-butene base polymer has preferably a 1,4-inserted part of 5% or less. When it exceeds 5%, a composition distribution of the polymer expands, so that an adverse effect is likely to be exerted on the physical properties.

The above 1-butene base polymer has a tensile elastic modulus of preferably 800 MPa or less, more preferably 500 MPa or less measured in accordance with a tensile test based on JIS K-7113. When it exceeds 800 MPa, the satisfactory softness is not obtained in a certain case.

When the 1-butene base polymers in the present invention has, in addition to the requisites described above, a melt endothermic amount ΔH of 60 J/g or less measured by means of DSC, the flexibility is excellent, and therefore it is preferred. It is more preferably 20 J/g or less. ΔH is an index showing whether or not soft, and the large index means that the elastic modulus is high and the softness is reduced. The melt endothermic amount ΔH is determined by the method described above.

In the 1-butene base polymers in the present invention, a component amount (H25) eluted in hexane of 25° C. is preferably 0 to 80% by weight, more preferably 0 to 60% by weight and most preferably 0 to 50% by weight. The H25 is an index showing whether an amount of a so-called sticky component which causes a reduction in stickiness and transparency is large or small, and it is meant that the higher this value is, the larger the amount of the sticky component is. When the H25 exceeds 80% by weight, blocking is caused because of a large amount of the sticky component, and the secondary processability and the surface characteristic are reduced in a certain case.

The H25 is a weight reduction rate calculated from the following equation, wherein measured are a weight ($W_0$) (0.9 to 1.1 g) of the 1-butene base polymer and a weight ($W_1$) of the 1-butene base polymer obtained after leaving the above 1-butene base polymer standing still in 200 milliliter of hexane at 25° C. for 4 days or longer and then drying:

$$H25=[(W_0-W_1)/W_0]\times 100(\%)$$

[2] Production Process for 1-butene Base Polymers

A production process for the 1-butene base polymer in the present invention includes a process in which a catalyst system called a metallocene catalyst is used to homopolymerize 1-butene or a process in which 1-butene is copolymerized with ethylene and/or α-olefins having 3 to 20 carbon atoms (provided that 1-butene is excluded).

The metallocene catalyst includes catalysts obtained by combining transition metal compounds having at least one of a cyclopentadienyl group, a substituted cyclopentadienyl group, an indenyl group and a substituted indenyl group as a ligand and transition metal compounds in which the above ligand is geometrically controlled with promoters, which are described in Japanese Patent Application Laid-Open No. 19309/1983, Japanese Patent Application Laid-Open No. 130314/1986, Japanese Patent Application Laid-Open No. 163088/1991, Japanese Patent Application Laid-Open No. 300887/1992, Japanese Patent Application Laid-Open No. 211694/1992 and Japanese Patent Application Laid-Open (through PCT) No. 502036/1989.

In the production process for the 1-butene base polymer in the present invention, a catalyst comprising a transition metal compound in which a ligand forms a cross-linking structure via a cross-linking group is preferred among metallocene catalysts, and suitably used is a process in which a metallocene catalyst obtained by combining a transition metal compound forming a cross-linking structure via two cross-linking groups with a promoter is used to homopolymerize 1-butene or a process in which 1-butene is copolymerized with ethylene and/or α-olefins having 3 to 20 carbon atoms (provided that 1-butene is excluded).

The specific examples thereof include a process in which 1-butene is homopolymerized in the presence of a polymerizing catalyst comprising a component selected from (A) a transition metal compound represented by General Formula (I):

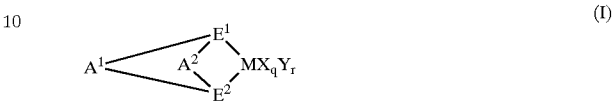

[wherein M represents the third to tenth group in the periodic table or a metal element of a lanthanoid series; $E^1$ and $E^2$ each are ligands selected from a substituted cyclopentadienyl group, an indenyl group, a substituted indenyl group, a heterocyclopentadienyl group, a substituted heterocyclopentadienyl group, an amide group, a phosphide group, a hydrocarbon group and a silicon-containing group, and they form a cross-linking structure via $A^1$ and $A^2$ and may be the same as or different from each other; X represents a σ-bonding ligand, and when plural X's are present, plural X's may be the same or different and may be cross-linked with other X, $E^1$, $E^2$ or Y; Y represents a Lewis base, and when plural Y's are present, plural Y's may be the same or different and may be cross-linked with other Y, $E^1$, $E^2$ or X; $A^1$ and $A^2$ are divalent cross-linking groups which combine two ligands, and they represent a hydrocarbon group having 1 to 20 carbon atoms, a halogen-containing hydrocarbon group having 1 to 20 carbon atoms, a silicon-containing group, a germanium-containing group, a tin-containing group, —O—, —CO—, —S—, —$SO_2$—, —Se—, —$NR^1$—, —$PR^1$—, —$P(O)R^1$—, —$BR^1$ or —$AlR^1$—; $R^1$ represents a hydrogen atom, a halogen atom, a hydrocarbon group having 1 to 20 carbon atoms or a halogen-containing hydrocarbon group having 1 to 20 carbon atoms, and they may be the same as or different from each other; q is an integer of 1 to 5 and represents [(valence of M)–2]; and r represents an integer of 0 to 3] and (B) (B-1) a compound which can be reacted with the above transition metal compound of the component (A) or a derivative thereof to form an ionic complex and (B-2) aluminoxane, or a process in which 1-butene is copolymerized with ethylene and/or α-olefins having 3 to 20 carbon atoms (provided that 1-butene is excluded).

In General Formula (I) described above, M represents the third to tenth group in the periodic table or a metal element of a lanthanoid series, and the specific examples thereof include titanium, zirconium, hafnium, yttrium, vanadium, chromium, manganese, nickel, cobalt, palladium and lanthanoid series metals, and among them, titanium, zirconium and hafnium are suited in terms of an olefin polymerization activity. $E^1$ and $E^2$ each represent ligands selected from a substituted cyclopentadienyl group, an indenyl group, a substituted indenyl group, a heterocyclopentadienyl group, a substituted heterocyclopentadienyl group, an amide group (—N<), a phosphine group (—P<), a hydrocarbon group (>CR—, >C<) and a silicon-containing group (>SiR—, >Si<) (provided that R represents hydrogen, a hydrocarbon group having 1 to 20 carbon atoms or a hetero atom-containing group), and they form a cross-linking structure via $A^1$ and $A^2$. $E^1$ and $E^2$ may be the same as or different from each other. These $E^1$ and $E^2$ are preferably a substituted cyclopentadienyl group, an indenyl group and substituted indenyl group.

X represents a σ-bonding ligand, and when plural X's are present, plural X's may be the same or different and may be cross-linked with other X, $E^1$, $E^2$ or Y. The specific examples of above X include a halogen atom, a hydrocarbon group having 1 to 20 carbon atoms, an alkoxy group having 1 to 20 carbon atoms, an aryloxy group having 6 to 20 carbon atoms, an amide group having 1 to 20 carbon atoms, a silicon-containing group having 1 to 20 carbon atoms, a phosphide group having 1 to 20 carbon atoms, a sulfide group having 1 to 20 carbon atoms and an acyl group having 1 to 20 carbon atoms. On the other hand, Y represents a Lewis base, and when plural Y's are present, plural Y's may be the same or different and may be cross-linked with other Y, $E^1$, $E^2$ or X. The specific examples of the Lewis base of above Y include amines, ethers, phosphines and thioethers.

Next, $A^1$ and $A^2$ are divalent cross-linking groups which combine two ligands, and they represent a hydrocarbon group having 1 to 20 carbon atoms, a halogen-containing hydrocarbon group having 1 to 20 carbon atoms, a silicon-containing group, a germanium-containing group, a tin-containing group, —O—, —CO—, —S—, —$SO_2$—, —Se—, —$NR^1$—, —$PR^1$—, —$P(O)R^1$—, —$BR^1$— or —$AlR^1$—. $R^1$ represents a hydrogen atom, a halogen atom, a hydrocarbon group having 1 to 20 carbon atoms or a halogen-containing hydrocarbon group having 1 to 20 carbon atoms, and they may be the same as or different from each other. Such cross-linking group includes, for example, a group represented by a general formula:

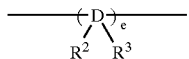

(wherein D represents carbon, silicon or tin; $R^2$ and $R^3$ each represent a hydrogen atom or a hydrocarbon group having 1 to 20 carbon atoms, and they may be the same as or different from each other or may be combined with each other to form a ring structure; and e represents an integer of 1 to 4). The specific examples thereof include methylene, ethylene, ethylidene, propylidene, isopropylidene, cyclohexylidene, 1,2-cyclohexylene, vinylidene ($CH_2$=C=), dimethylsilylene, diphenylsilylene, methylphenylsilylene, dimethylgermylene, dimethylstannylene, tetramethyldisilylene and diphenyldisilylene. Among them, ethylene, isopropylidene and dimethylsilylene are suited. q is an integer of 1 to 5 and represents [(valence of M)−2], and r represents an integer of 0 to 3.

Among such transition metal compounds represented by General Formula (I), preferred is a transition metal compound represented by General Formula (II) comprising a double cross-linking type biscyclopentadienyl derivative as a ligand:

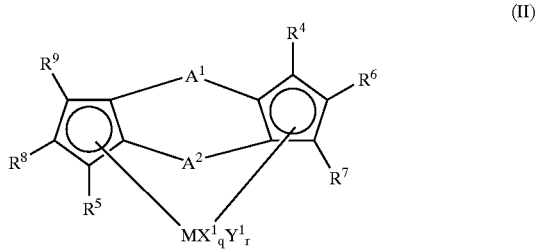

(II)

In General Formula (II) described above, M, $A^1$, $A^2$, q and r are the same as those described above. $X^1$ represents a σ-bonding ligand, and when plural $X^1$'s are present, plural $X^1$'s may be the same or different and may be cross-linked with other $X^1$ or $Y^1$. The same ones given as the examples in the explanation of X in General Formula (I) can be given as the specific examples of this $X^1$. $Y^1$ represents a Lewis base, and when plural $Y^1$'s are present, plural $Y^1$'s may be the same or different and may be cross-linked with other $Y^1$ or $X^1$. The same ones given as the examples in the explanation of Y in General Formula (I) can be given as the specific examples of this $Y^1$. $R^4$ to $R^9$ each represent a hydrogen atom, a halogen atom, a hydrocarbon group having 1 to 20 carbon atoms, a halogen-containing hydrocarbon group having 1 to 20 carbon atoms, a silicon-containing group or a hetero atom-containing group, and at least one of them does not have to be a hydrogen atom. $R^4$ to $R^9$ may be the same as or different from each other, and the groups adjacent to each other may be combined with each other to form a ring. Especially, rings are preferably formed by $R^6$ and $R^7$ and $R^8$ and $R^9$. $R^4$ and $R^5$ are preferably groups containing heteroatoms such as oxygen, halogen and silicon since the polymerization activity is raised.

The transition metal compound comprising this double cross-linking type biscyclopentadienyl derivative as a ligand is preferably a compound containing silicon in a cross-linking group between the ligands.

The specific examples of the transition metal compound represented by General Formula (I) include (1,2'-ethylene)(2,1'-ethylene)-bis(indenyl)zirconium dichloride, (1,2'-methylene)(2,1'-methylene)-bis(indenyl)zirconium dichloride, (1,2'-isopropylidene)(2,1'-isopropylidene)-bis(indenyl)zirconium dichloride, (1,2'-ethylene)(2,1'-ethylene)-bis(3-methylindenyl)zirconium dichloride, (1,2'-ethylene)(2,1'-ethylene)-bis(4,5-benzoindenyl)zirconium dichloride, (1,2'-ethylene)(2,1'-ethylene)-bis(4-isopropylindenyl)zirconium dichloride, (1,2'-ethylene)(2,1'-ethylene)-bis(5,6-dimethylindenyl)zirconium dichloride, (1,2'-ethylene)(2,1'-ethylene)-bis(4,7-diisopropylindenyl)zirconium dichloride, (1,2'-ethylene)(2,1'-ethylene)-bis(4-phenylindenyl)zirconium dichloride, (1,2'-ethylene)(2,1'-ethylene)-bis(3-methyl-4-isopropylindenyl)zirconium dichloride, (1,2'-ethylene)(2,1'-ethylene)-bis(5,6-benzoindenyl)zirconium dichloride, (1,2'-ethylene)(2,1'-isopropylidene)-bis(indenyl)zirconium dichloride, (1,2'-methylene)(2,1'-ethylene)-bis(indenyl)zirconium dichloride, (1,2'-methylene)(2,1'-isopropylidene)-bis(indenyl)zirconium dichloride, (1,2'-dimethylsilylene)(2,1'-dimethylsilylene)-bis(indenyl)zirconium dichloride, (1,2'-dimethylsilylene)(2,1'-dimethylsilylene)-bis(3-methylindenyl)zirconium dichloride, (1,2'-dimethylsilylene)(2,1'-dimethylsilylene)-bis(3-butylindenyl)zirconium dichloride, (1,2'-dimethylsilylene)(2,1'-dimethylsilylene)-bis(3-i-propylindenyl)zirconium dichloride, (1,2'-dimethylsilylene)(2,1'-dimethylsilylene)-bis(3-trimethylsilylmethylindenyl)zirconium dichloride, (1,2'-dimethylsilylene)(2,1'-dimethylsilylene)-bis(3-phenylindenyl)zirconium dichloride, (1,2'-dimethylsilylene)(2,1'-dimethylsilylene)-bis(4,5-benzoindenyl)zirconium dichloride, (1,2'-dimethylsilylene)(2,1'-dimethylsilylene)-bis(4-isopropylindenyl)zirconium dichloride, (1,2'-dimethylsilylene)(2,1'-dimethylsilylene)-bis(5,6-dimethylindenyl)zirconium dichloride, (1,2'-dimethylsilylene)(2,1'-dimethylsilylene)-bis(4,7-di-i-propylindenyl)zirconium dichloride, (1,2'-dimethylsilylene)(2,1'-dimethylsilylene)-bis(4-phenylindenyl)zirconium dichloride, (1,2'-dimethylsilylene)(2,1'-dimethylsilylene)-bis(3-methyl-4-i-propylindenyl)zirconium dichloride, (1,2'-dimethylsilylene)(2,1'-dimethylsilylene)-bis(5,6-benzoindenyl)zirconium dichloride, (1,2'-dimethylsilylene)(2,1'-isopropylidene)-bis(indenyl)zirconium dichloride, (1,2'-dimethylsilylene)(2,1'-isopropylidene)-bis(3-methylindenyl)zirconium dichloride, (1,2'-dimethylsilylene)(2,1'-isopropylidene)-bis(3-i-propylindenyl)zirconium dichloride, (1,2'-dimethylsilylene)(2,1'-isopropylidene)-bis(3-n-butylindenyl)zirconium dichloride, (1,2'-dimethylsilylene)(2,1'-isopropylidene)-bis(3-trimethylsilylmethylindenyl)zirconium dichloride, (1,2'-dimethylsilylene)(2,1'-isopropylidene)-bis(3-trimethylsilylindenyl)zirconium dichloride, (1,2'-dimethylsilylene)(2,1'-isopropylidene)-bis(3-phenylindenyl)zirconium dichloride, (1,2'-dimethylsilylene)(2,1'-methylene)-bis(indenyl)zirconium dichloride, (1,2'-dimethylsilylene)(2,1'-methylene)-bis(3-methylindenyl)zirconium dichloride, (1,2'-dimethylsilylene)(2,1'-methylene)-bis(3-i-propylindenyl)zirconium dichloride, (1,2'-dimethylsilylene)(2,1'-methylene)-bis(3-n-butylindenyl)zirconium dichloride, (1,2'-dimethylsilylene)(2,1'-methylene)-bis(3-trimethylsilylmethylindenyl)zirconium dichloride, (1,2'-dimethylsilylene)(2,1'-methylene)-bis(3-trimethylsilylindenyl)zirconium dichloride, (1,2'-diphenylsilylene)(2,1'-methylene)-bis(indenyl)zirconium dichloride, (1,2'-diphenylsilylene)(2,1'-methylene)-bis(3-methylindenyl)zirconium dichloride, (1,2'-diphenylsilylene)(2,1'-methylene)-bis(3-i-propylindenyl)zirconium dichloride, (1,2'-diphenylsilylene)(2,1'-methylene)-bis(3-n-butylindenyl)zirconium dichloride, (1,2'-diphenylsilylene)(2,1'-methylene)-bis(3-trimethylsilylmethylindenyl)zirconium dichloride, (1,2'-diphenylsilylene)(2,1'-methylene)-bis(3-trimethylsilylindenyl)zirconium dichloride, (1,2'-dimethylsilylene)(2,1'-dimethylsilylene)(3-methylcyclopentadienyl)(3'-methylcyclopentadienyl)zirconium dichloride, (1,2'-dimethylsilylene)(2,1'-isopropylidene)(3-methylcyclopentadienyl)(3'-methylcyclopentadienyl)zirconium dichloride, (1,2'-dimethylsilylene)(2,1'-ethylene)(3-methylcyclopentadienyl)(3'-methylcyclopentadienyl)zirconium dichloride, (1,2'-ethylene)(2,1'-methylene)(3-methylcyclopentadienyl)(3'-methylcyclopentadienyl)zirconium dichloride, (1,2'-ethylene)(2,1'-isopropylidene)(3-methylcyclopentadienyl)(3'-methylcyclopentadienyl)zirconium dichloride, (1,2'-methylene)(2,1'-methylene)(3-methylcyclopentadienyl)(3'-methylcyclopentadienyl)zirconium dichloride, (1,2'-methylene)(2,1'-isopropylidene)(3-methylcyclopentadienyl)(3'-methylcyclopentadienyl)zirconium dichloride, (1,2'-isopropylidene)(2,1'-isopropylidene)(3-methylcyclopentadienyl)(3'-methylcyclopentadienyl)zirconium dichloride, (1,2'-dimethylsilylene)(2,1'-dimethylsilylene)(3,4-dimethylcyclopentadienyl)(3',4'-dimethylcyclopentadienyl)zirconium dichloride, (1,2'-dimethylsilylene)(2,1'-isopropylidene)(3,4-dimethylcyclopentadienyl)(3',4'-dimethylcyclopentadienyl)zirconium dichloride, (1,2'-dimethylsilylene)(2,1'-ethylene)(3,4-dimethylcyclopentadienyl)(3',4'-dimethylcyclopentadienyl)zirconium dichloride, (1,2'-ethylene)(2,1'-methylene)(3,4-dimethylcyclopentadienyl)(3',4'-dimethylcyclopentadienyl)zirconium dichloride, (1,2'-ethylene)(2,1'-isopropylidene)(3,4-dimethylcyclopentadienyl)(3',4'-dimethylcyclopentadienyl)zirconium dichloride, (1,2'-methylene)(2,1'-methylene)(3,4-dimethylcyclopentadienyl)(3',4'-dimethylcyclopentadienyl)zirconium dichloride, (1,2'-methylene)(2,1'-isopropylidene)(3,4-dimethylcyclopentadienyl)(3',4'-dimethylcyclopentadienyl)zirconium dichloride, (1,2'-isopropylidene)(2,1'-isopropylidene)(3,4-dimethylcyclopentadienyl)(3',4'-dimethylcyclopentadienyl), (1,2'-dimethylsilylene)(2,1'-dimethylsilylene)(3-methyl-5-ethylcyclopentadienyl)(3'-methyl-5'-ethylcyclopentadienyl)zirconium dichloride, (1,2'-dimethylsilylene)(2,1'-dimethylsilylene)(3-methyl-5-ethylcyclopentadienyl)(3'-methyl-5'-ethylcyclopentadienyl)zirconium dichloride, (1,2'-dimethylsilylene)(2,1'-dimethylsilylene)(3-methyl-5-isopropylcyclopentadienyl)(3'-methyl-5'-isopropylcyclopentadienyl)zirconium dichloride, (1,2'-dimethylsilylene)(2,1'-dimethylsilylene)(3-methyl-5-n-butylcyclopentadienyl)(3'-methyl-5'-n-butylcyclopentadienyl)zirconium dichloride, (1,2'-dimethylsilylene)(2,1'-dimethylsilylene)(3-methyl-5-phenylcyclopentadienyl)(3'-methyl-5'-phenylcyclopentadienyl)zirconium dichloride, (1,2'-dimethylsilylene)(2,1'-isopropylidene)(3-methyl-5-ethylcyclopentadienyl)(3'-methyl-5'-ethylcyclopentadienyl)zirconium dichloride, (1,2'-dimethylsilylene)(2,1'-isopropylidene)(3-methyl-5-i-propylcyclopentadienyl)(3'-methyl-5'-i-propylcyclopentadienyl)zirconium dichloride, (1,2'-dimethylsilylene)(2,1'-isopropylidene)(3-methyl-5-n-butylcyclopentadienyl)(3'-methyl-5'-n-butylcyclopentadienyl)zirconium dichloride, (1,2'-dimethylsilylene)(2,1'-isopropylidene)(3-methyl-5-phenylcyclopentadienyl)(3'-methyl-5'-phenylcyclopentadienyl)zirconium dichloride, (1,2'-dimethylsilylene)(2,1'-ethylene)(3-methyl-5-ethylcyclopentadienyl)(3'-methyl-5'-ethylcyclopentadienyl)zirconium dichloride, (1,2'-dimethylsilylene)(2,1'-ethylene)(3-methyl-5-i-propylcyclopentadienyl)(3'-methyl-5'-i-propylcyclopentadienyl)zirconium dichloride, (1,2'-dimethylsilylene)(2,1'-ethylene)(3-methyl-5-n-butylcyclopentadienyl)(3'-methyl-5'-n-butylcyclopentadienyl)zirconium dichloride, (1,2'-dimethylsilylene)(2,1'-ethylene)(3-methyl-5-phenylcyclopentadienyl)(3'-methyl-5'-phenylcyclopentadienyl)zirconium dichloride, (1,2'-dimethylsilylene)(2,1'-methylene)(3-methyl-5-ethylcyclopentadienyl)(3'-methyl-5'-ethylcyclopentadienyl)zirconium dichloride, (1,2'-dimethylsilylene)(2,1'-methylene)(3-methyl-5-i-propylcyclopentadienyl)(3'-methyl-5'-i-propylcyclopentadienyl)zirconium dichloride, (1,2'-dimethylsilylene)(2,1'-methylene)(3-methyl-5-n-butylcyclopentadienyl)(3'-methyl-5'-n-butylcyclopentadienyl)zirconium dichloride, (1,2'-dimethylsilylene)(2,1'-methylene)(3-methyl-5-phenylcyclopentadienyl)(3'-methyl-5'-phenylcyclopentadienyl)zirconium dichloride, (1,2'-ethylene)(2,1'-methylene)(3-methyl-5-i-propylcyclopentadienyl)(3'-methyl-5'-i-propylcyclopentadienyl)zirconium dichloride, (1,2'-ethylene)(2,1'-isopropylidene)(3-methyl-5-i-propylcyclopentadienyl)(3'-methyl-5'-i-propylcyclopentadienyl)zirconium dichloride, (1,2'-methylene)(2,1'-methylene)(3-methyl-5-i-propylcyclopentadienyl)(3'-methyl-5'-i-propylcyclopentadienyl)zirconium dichloride, (1,2'-methylene)(2,1'-isopropylidene)(3-methyl-5-i-propylcyclopentadienyl)(3'-methyl-5'-i-propylcyclopentadienyl)zirconium dichloride, (1,1'-dimethylsilylene)(2,2'-dimethylsilylene)bisindenylzirconium dichloride, (1,1'-diphenylsilylene)(2,2'-dimethylsilylene)bisindenylzirconium dichloride, (1,1'-dimethylsilylene)(2,2'-dimethylsilylene)bisindenylzirconium dichloride, (1,1'-diisopropylsilylene)(2,2'-dimethylsilylene)bisindenylzirconium dichloride, (1,1'-dimethylsilylene)(2,2'-diisopropylsilylene)bisindenylzirconium dichloride, (1,1'-dimethylsilyleneindenyl)(2,2'-dimethylsilylene-3- trimethylsilylindenyl)zirconium dichloride, (1,1'-diphenylsilyleneindenyl)(2,2'-diphenylsilylene-3-trimethylsilylindenyl)zirconium dichloride, (1,1'-diphenylsilyleneindenyl)(2,2'-dimethylsilylene-3-trimethylsilylindenyl)zirconium dichloride, (1,1'-dimethylsilylene)(2,2'-dimethylsilylene)(indenyl)(3-trimethylsilylindenyl)zirconium dichloride, (1,1'-diphenylsilylene)(2,2'-diphenylsilylene)(indenyl)(3-trimethylsilylindenyl)zirconium dichloride, (1,1'-diphenylsilylene)(2,2'-dimethylsilylene)(indenyl)(3-trimethylsilylindenyl)zirconium dichloride, (1,1'-dimethylsilylene)(2,2'-diphenylsilylene)(indenyl)(3-trimethylsilylindenyl)zirconium dichloride, (1,1'-diisopropylsilylene)(2,2'-dimethylsilylene)(indenyl)(3-trimethylsilylindenyl)zirconium dichloride, (1,1'-dimethylsilylene)(2,2'-diisopropylsilylene)(indenyl)(3-trimethylsilylindenyl)zirconium dichloride, (1,1'-diisopropylsilylene)(2,2'-diisopropylsilylene)(indenyl)(3-trimethylsilylindenyl)zirconium dichloride, (1,1'-dimethylsilylene)(2,2'-dimethylsilylene)(indenyl)(3-trimethylsilylmethylindenyl)zirconium dichloride, (1,1'-diphenylsilylene)(2,2'-diphenylsilylene)(indenyl)(3-trimethylsilylmethylindenyl)zirconium dichloride, (1,1'-diphenylsilylene)(2,2'-dimethylsilylene)(indenyl)(3-trimethylsilylmethylindenyl)zirconium dichloride, (1,1'-dimethylsilylene)(2,2'-diphenylsilylene)(indenyl)(3-trimethylsilylmethylindenyl)zirconium dichloride, (1,1'-diisopropylsilylene)(2,2'-dimethylsilylene)(indenyl)(3-trimethylsilylmethylindenyl)zirconium dichloride, (1,1'-dimethylsilylene)(2,2'-diisopropysilylene)(indenyl)(3-trimethylsilylmethylindenyl)zirconium dichloride, (1,1'-diisopropylsilylene)(2,2'-diisopropylsilylene)(indenyl)(3-trimethylsilylmethylindenyl)zirconium dichloride, and compounds obtained by substituting zirconium in these compounds with titanium or hafnium. It is a matter of course that they shall not be restricted to these compounds. Further, they may be analogous compounds of metal elements of the other groups or a lanthanoid series. In the compounds described above, (1,1'-)(2,2'-) may be (1,2'-)(2,1'-), and (1,2'-)(2,1'-) may be (1,1'-) (2,2'-).

Next, any compounds can be used for the component (B-1) out of the components (B) as long as they can be reacted with the transition metal compound of the component (A) described above to form an ionic complex, and compounds represented by the following General Formulas (III) and (IV) can suitably be used:

  (III)

  (IV)

($L^2$ is $M^2$, $R^{11}R^{12}M^3$, $R^{13}{}_3C$ or $R^{14}M^3$)
[in General Formulas (III) and (IV), $L^1$ is a Lewis base; $[Z]^-$ is a non-coordinate anion $[Z^1]^-$ and $[Z^2]^-$, wherein $[Z^1]^-$ is an anion in which plural groups are combined with an element, that is, $[M^1G^1G^2 \ldots G^f]^{31}$ (wherein $M^1$ represents a 5th to 15th group element, preferably a 13th to 15th group element in the periodic table; $G^1$ to $G^f$ each represent a hydrogen atom, a halogen atom, an alkyl group having 1 to 20 carbon atoms, a dialkylamino group having 2 to 40 carbon atoms, an alkoxy group having 1 to 20 carbon atoms, an aryl group having 6 to 20 carbon atoms, an aryloxy group having 6 to 20 carbon atoms, an alkylaryl group having 7 to 20 carbon atoms, a halogen-substituted hydrocarbon group having 1 to 20 carbon atoms, an acyloxy group having 1 to 20 carbon atoms, an organic metalloid group or a hetero atom-substituted hydrocarbon group having 2 to 20 carbon atoms; two or more groups of $G^1$ to $G^f$ may form a ring; and f represents an integer of [(valence of central metal $M^1$)+1]); $[Z^2]^-$ represents a conjugate base of a Brønsted acid alone in which a logarithm (pKa) of an inverse number of an acid dissociation constant is −10 or less or a combination of a Brønsted acid and a Lewis acid or a conjugate base of an acid defined as a ultra strong acid; a Lewis base may be coordinated; $R^{10}$ represents a hydrogen atom, an alkyl group having 1 to 20 carbon atoms, an aryl group having 6 to 20 carbon atoms, an alkylaryl group or an arylalkyl group; $R^{11}$ and $R^{12}$ each represent a cyclopentadienyl group, a substituted cyclopentadienyl group, an indenyl group or a fluorenyl group; $R^{13}$ represents an alkyl group having 1 to 20 carbon atoms, an aryl group, an alkylaryl group or an arylalkyl group; $R^{14}$ represents a large ring ligand such as tetraphenylporphyrin and phthalocyanine; k is an ionic valence of $[L^1-R^{10}]$ and $[L^2]$ and represents an integer of 1 to 3; a represents an integer of 1 or more; b is (k×a); $M^2$ includes a first to third, 11th to 13th and 17th element in the periodic table; and $M^2$ represents a 7th to 12th element in the periodic table].

In this case, the specific examples of $L^1$ include ammonia, amines such as methylamine, aniline, dimethylamine, diethylamine, N-methylaniline, diphenylamine, N,N-dimethylaniline, trimethylamine, tri-n-butylamine, methyldiphenylamine, pyridine, p-bromo-N,N-dimethylaniline and p-nitro-N,N-dimethylaniline, phosphines such as triethylphosphine, triphenylphosphine and diphenylphosphine, thioethers such as tetrahydrothiophene, esters such as ethyl benzoate and nitriles such as benzonitrile.

Specific examples of $R^{10}$ include hydrogen, methyl, ethyl, benzyl and trityl. Specific examples of $R^{11}$ and $R^{12}$ include cyclopentadienyl, methylcyclopentadienyl, ethylcyclopentadienyl and pentamethylcyclopentadienyl. Specific examples of $R^{13}$ include phenyl, p-tolyl and p-methoxyphenyl. Specific examples of $R^{14}$ include teteraphenylporphin, phthalocyanine, allyl and metallyl. Specific examples of $M^2$ include Li, Na, K, Ag, Cu, Br, I and $I_3$. Specific examples of $M^3$ include Mn, Fe, Co, Ni and Zn.

In $[Z^1]^-$, that is, $[M^1G^1G^2 \ldots G^f]^-$, specific examples of $M^1$ include B, Al, Si, P, As and Sp, B and Al being preferably employed. Specific examples of $G^1G^2 \ldots G^f$ include a dialkylamino group such as dimethylamino, an alkoxy group or an aryloxy group such as methoxy, ethoxy, n-butoxy and phenoxy, a hydrocarbon group such as methyl, ethyl, n-propyl, isopropyl, n-butyl, isobutyl, n-octyl, n-eicosyl, phenyl, p-tolyl, benzyl, 4-t-butylphenyl and 3,5-dimethylphenyl, a halogen atom such as fluorine, chlorine, bromine and iodine, a hetero atom-containing hydrocarbon group such as p-fluorophenyl, 3,5-difluorophenyl, pentachlorophenyl, 3,4,5-trifluorophenyl, pentafluorophenyl, 3,5-bis(trifluoromethyl)phenyl and bis(trimethylsilyl)methyl and an organic metalloid group such as pentamethylantimony, trimethylsilyl, trimethylgermyl, diphenylarsine, dicyclohexylantimony and diphenylboron.

Also, specific examples of the non-coordinate anion, that is, the conjugate base $[Z^2]^-$ of a Brønsted acid alone in which pKa is −10 or less or a combination of a Brønsted acid and a Lewis acid include a trifluoromethanesulfonic acid anion $(CF_3SO_3)^-$, a bis(trifluoromethanesulfonyl)methyl anion, a bis(trifluoromethanesulfonyl)benzyl anion, bis(trifluoromethanesulfonyl)amide, a perchloric acid anion $(ClO_4)^-$, a trifluoroacetic acid anion $(CF_3CO_2)^-$, a hexafluoroantimony anion $(SbF_6)^-$, a fluorosulfonic acid anion $(FSO_3)^-$, a chlorosulfonic acid anion $(ClSO_3)^-$, fluorosulfonic acid anion/antimony pentafluoride $(FSO_3/SbF_5)^-$, fluorosulfonic acid anion/arsenic pentafluoride $(FSO_3/$ $ASF_5)^-$ and trifluoromethanesulfonic acid/antimony pentafluoride $(CF_3SO_3/SbF_5)^-$.

Specific examples of the ionic compound which is reacted with the transition metal compound of the component (A) described above to form an ionic complex, that is, the component (B-1) include triethylammonium tetraphenylborate, tri-n-buthylammonium tetraphenylborate, trimethylammonium tetraphenylborate, tetraethylammonium tetraphenylborate, methyl(tri-n-butyl)ammonium tetraphenylborate, benzyl(tri-n-butyl)ammonium tetraphenylborate, dimethyldiphenylammonium tetraphenylborate, triphenyl(methyl)ammonium tetraphenylborate, trimethylanilinium tetraphenylborate, methylpyridinium tetraphenylborate, benzylpyridinium tetraphenylborate, methyl(2-cyanopyridinium) tetraphenylborate, triethylammonium tetrakis(pentafluorophenyl)borate, tri-n-butylammonium tetrakis(pentafluorophenyl)borate, triphenylammonium tetrakis(pentafluorophenyl)borate, tetra-n-butylammonium tetrakis(pentafluorophenyl)borate, tetraethylammonium tetrakis(pentafluorophenylborate), benzyl(tri-n-butyl)ammonium tetrakis(pentafluorophenyl)borate, methyldiphenylammonium tetrakis(pentafluorophenyl)borate, triphenyl(methyl)ammonium tetrakis(pentafluorophenyl)borate, methylanilinium tetrakis(pentafluorophenyl)borate, dimethylanilinium tetrakis(pentafluorophenyl)borate, trimethylanilinium tetrakis(pentafluorophenyl)borate, methylpyridinium tetrakis(pentafluorophenyl)borate, benzylpyridinium tetrakis(pentafluorophenyl)borate, methyl(2-cyanopyridinium) tetrakis(pentafluorophenyl)borate, benzyl(2-cyanopyridinium) tetrakis(pentafluorophenyl)borate, methyl(4-cyanopyridinium) tetrakis(pentafluorophenyl)borate, triphenylphosphonium tetrakis(pentafluorophenyl)borate, dimethylanilinium tetrakis[bis(3,5-difluoromethyl)phenyl]borate, ferrocenium tetraphenylborate, silver tetraphenylborate, triethyl tetraphenylborate, tetraphenylporphyrinmanganese tetraphenylborate, ferrocenium tetrakis(pentafluorophenyl)borate, (1,1'-dimethylferrocenium) tetrakis(pentafluorophenyl)borate, decamethylferrocenium tetrakis(pentafluorophenyl)borate, silver tetrakis(pentafluorophenyl)borate, trityl tetrakis(pentafluorophenyl)borate, lithium tetrakis(pentafluorophenyl)borate, sodium tetrakis(pentafluorophenyl)borate, tetraphenylporphyrinmanganese tetrakis(pentafluorophenyl)borate, silver tetrafluoroborate, silver hexafluorophosphate, silver hexafluoroarsenate, silver perchlorate, silver trifluoroacetate and silver trifluoromethanesulfonate.

(B-1) may be used alone or in combination of two or more kinds thereof.

On the other hand, examples of aluminoxane of the component (B-2) include linear aluminoxane represented by General Formula (V):

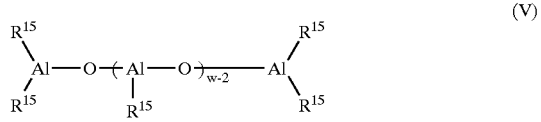

(wherein $R^{15}$ represents a hydrocarbon group such as an alkyl group having 1 to 20 carbon atoms, preferably 1 to 12 carbon atoms, an alkenyl group, an aryl group and an arylalkyl group or a halogen atom; w represents an average polymerization degree and is usually an integer of 2 to 50, preferably 2 to 40; and respective $R^{15}$'s may be the same or different) and cyclic aluminoxane represented by General Formula (VI):

(wherein $R^{15}$ and w are the same as those in General Formula (V) described above).

A production process for the aluminoxanes described above includes a process in which alkylaluminum is brought into contact with a condensing agent such as water, but a means thereof shall not specifically be restricted, and they may be reacted according to a publicly known method. It includes, for example, (1) a process in which an organic aluminum compound is dissolved in an organic solvent and in which this is brought into contact with water, (2) a process in which an organic aluminum compound is first added in polymerization and in which water is then added thereto, (3) a process in which an organic aluminum compound is reacted with crystal water contained in a metal salt or water adsorbed on an inorganic matter and an organic matter and (4) a process in which tetraalkyldialuminoxane is reacted with trialkylaluminum and further reacted with water. Aluminoxane may be insoluble in toluene.

These aluminoxanes may be used alone or in combination of two or more kinds thereof.

A use proportion of the catalyst component (A) to the catalyst component (B) falls in a range of preferably 10:1 to 1:100, more preferably 2:1 to 1:10 in terms of a mole ratio when the compound (B-1) is used for the catalyst component (B), and when it deviates from the range described above, the catalyst cost per a unit mass of the polymer increases, so that it is not practical. When the compound (B-2) is used, it falls in a range of preferably 1:1 to 1:1000000, more preferably 1:10 to 1:10000 in terms of a mole ratio. When it deviates from the range described above, the catalyst cost per a unit mass of the polymer increases, so that it is not practical. Also, (B-1) and (B-2) can be used alone or in combination of two or more kinds thereof for the catalyst component (B).

Further, an organic aluminum compound as a component (C) in addition to the component (A) and the component (B) each described above can be used for the polymerization catalyst in producing the 1-butene base polymers.

Capable of being emoployed as the organic aluminum compound of the component (C) is a compound represented by General Formula (VII):

$$R^{16}_{v}AlJ_{3-v} \quad (VII)$$

[wherein $R^{16}$ represents an alkyl group having 1 to 10 carbon atoms; J represents a hydrogen atom, an alkoxy group having 1 to 20 carbon atoms, an aryl group having 6 to 20 carbon atoms or a halogen atom; and v represents an integer of 1 to 3].

The specific examples of the compound represented by General Formula (VII) described above include trimethylaluminum, triethylaluminum, triisopropylaluminum, triisobutylaluminum, dimethylaluminum chloride, diethylaluminum chloride, methylaluminum dichloride, ethylaluminum dichloride, dimethylaluminum fluoride, diisobutylaluminum hydride, diethylaluminum hydride and ethylaluminum sesquichloride.

These organic aluminum compounds may be used alone or in a combination of two or more kinds thereof.

In the production process for the 1-butene base polymer, preliminary contact can be carried out as well using the component (A), the component (B) and the component (C) each described above. The preliminary contact can be carried out by bringing the component (A) into contact with, for example, the component (B). This process shall not specifically be restricted, and a publicly known process can be used. This preliminary contact is effective for reducing the catalyst cost due to a rise in the catalyst activity and a reduction in a use proportion of the component (B) which is a promoter. Further, bringing the component (A) into contact with the component (B-2) brings about an effect of elevating the molecular weight in addition to the effect described above. The preliminary contact temperature is usually −20° C. to 200° C., preferably −10° C. to 150° C. and more preferably 0° C. to 80° C. In the preliminary contact, aliphatic hydrocarbons and aromatic hydrocarbons can be used as a solvent of inert hydrocarbon. Among them, the aliphatic hydrocarbons are particularly preferred.

A use proportion of the catalyst component (A) to the catalyst component (C) falls in a range of preferably 1:1 to 1:10000, more preferably 1:5 to 1:2000 and further preferably 1:10 to 1:1000 in terms of a mole ratio. Use of the catalyst component (C) makes it possible to elevate the polymerization activity per transition metal, but too much amount thereof not only wastes the organic aluminum compound but also remains in the polymer, and therefore it is not preferred.

In the production of the 1-butene base polymer, at least one of the catalyst components can be carried on a suitable carrier and used. The kind of the above carrier shall not specifically be restricted, and any of inorganic oxide carriers, inorganic carriers excluding them and organic carriers can be used. In particular, the inorganic oxide carriers and the inorganic carriers excluding them are preferred.

The inorganic oxide carriers include, to be specific, $SiO_2$, $Al_2O_3$, MgO, $ZrO_2$, $TiO_2$, $Fe_2O_3$, $B_2O_3$, CaO, ZnO, BaO, $ThO_2$ and mixtures thereof, for example, silica alumina, zeolite, ferrite and glass fiber. Among them, $SiO_2$ and $Al_2O_3$ are particularly preferred. The inorganic oxide carriers described above may contain a small amount of carbonates, nitrates and sulfates.

On the other hand, magnesium compounds represented by $MgR^{17}_xX^1_y$ such as MgCl and $Mg(OC_2H_5)_2$ and complex salts thereof can be nominated as carriers other than those described above. In this case, $R^{17}$ represents an alkyl group having 1 to 20 carbon atoms, an alkoxy group having 1 to 20 carbon atoms or an aryl group having 6 to 20 carbon atoms; $X^1$ represents a halogen atom or an alkyl group having 1 to 20 carbon atoms; x is 0 to 2; y is 0 to 2, and x+y=2; and respective $R^{17}$ and respective $X^1$ each may be the same or different.

Also, examples of the organic carrier include polymers such as polystyrene, styrene-divinylbenzene copolymers, polyethylene, poly(1-butene), substituted polystyrene and polyallylate, starch and carbon.

$MgCl_2$, $MgCl(OC_2H_5)$, $Mg(OC_2H_5)_2$, $SiO_2$ and $Al_2O_3$ are preferred as the carrier for the catalyst used for the production of the 1-butene base polymer. The properties of the carrier are varied depending on the kind thereof and the production process, and the average particle diameter is usually 1 to 300 µm, preferably 10 to 200 µm and more preferably 20 to 100 µm.

When the particle diameter is small, fine powders contained in the polymer increase, and when the particle diameter is large, coarse particles contained in the polymer grow larger and cause a reduction in the bulk density and clogging of a hopper.

The carrier has a specific surface area of usually 1 to 1000 $m^2/g$, preferably 50 to 500 $m^2/g$ and a pore volume of usually 0.1 to 5 $cm^3/g$, preferably 0.3 to 3 $cm^3/g$.

When either the specific surface area or the pore volume deviates from the range described above, the catalyst activity reduces in a certain case. The specific surface area and the pore volume can be determined from a volume of adsorbed nitrogen gas according to, for example, a BET method.

Further, when the carrier described above is the inorganic oxide carrier, it is preferably used after burned usually at 150 to 1000° C., preferably 200 to 800° C.

When at least one of the catalyst components is carried on the carrier described above, at least one of the catalyst component (A) and the catalyst component (B), preferably both of the catalyst component (A) and the catalyst component (B) are carried thereon.

A method for carrying at least one of the catalyst component (A) and the catalyst component (B) on the above carrier shall not specifically be restricted, and capable of being used are, for example, (1) a method in which at least one of the component (A) and the component (B) is mixed with the carrier, (2) a method in which the carrier is processed with an organic aluminum compound or a halogen-containing silicon compound and in which at least one of the component (A) and the component (B) is then mixed therewith in an inert solvent, (3) a method in which the carrier and the component (A) and/or the component (B) are reacted with the organic aluminum compound or the halogen-containing silicon compound, (4) a method in which the component (A) or the component (B) is carried on the carrier and in which the catalyst component (B) or the catalyst component (A) is then mixed therewith, (5) a method in which a contact reaction product of the component (A) and the component (B) is mixed with the carrier and (6) a method in which the carrier is allowed to be coexistent in the contact reaction of the component (A) and the component (B).

In the methods (4), (5) and (6) described above, the organic aluminum compound of the component (C) can be added as well.

In the production of the catalyst used for producing the 1-butene base polymers, the catalyst may be prepared by irradiating an elastic wave at the timing of bringing the components (A), (B) and (C) described above into contact. The elastic wave ordinarily includes a sonic wave, particularly preferably an ultrasonic wave. To be specific, it includes an ultrasonic wave having a frequency of 1 to 1000 kHz, preferably 10 to 500 kHz.

The catalyst thus obtained may be used for polymerization after once distilling off the solvent and taking out the catalyst in the form of a solid matter, or it may be used as it is.

In the production of the 1-butene base polymer, the catalyst can be produced by conducting a carrying operation of at least one of the component (A) and the component (B) on the carrier in the polymerization system. Capable of being employed is, for example, a method in which at least one of the component (A) and the component (B) and the carrier and, if necessary, the organic aluminum compound of the component (C) described above are added and in which olefin such as ethylene is added at an atmospheric pressure to 2 MPa (gauge) to carry out preliminary polymerization at −20 to 200° C. for one minute to 2 hours to thereby form catalyst particles.

A use proportion of the component (B-1) to the carrier in the catalyst used for producing the 1-butene base polymer is preferably 1:5 to 1:10000, more preferably 1:10 to 1:500 in terms of a mass ratio, and a use proportion of the component (B-2) to the carrier is preferably 1:0.5 to 1:1000, more preferably 1:1 to 1:50 in terms of a mass ratio. When two or more kids of the components (B) are used in a mixture, a use proportion of the respective components (B) to the carrier falls in the range described above in terms of a mass ratio. Further, a use proportion of the component (A) to the carries is preferably 1:5 to 1:10000, more preferably 1:10 to 1:500 in terms of a mass ratio.

When a use proportion of the component (B) [the component (B-1) or the component (B-2)] to the carrier or a use proportion of the component (A) to the carrier deviates from the range described above, the activity reduces in a certain case.

The catalyst for polymerization thus prepared has an average particle diameter of usually 2 to 200 µm, preferably 10 to 150 µm and particularly preferably 20 to 100 µm and a specific surface area of usually 20 to 1000 m$^2$/g, preferably 50 to 500 m$^2$/g. When the average particle diameter is smaller than 2 µm, fine powders contained in the polymer grow greater in a certain case, and when it exceeds 200 µm, coarse particles contained in the polymer increase in a certain case. When the specific surface area is less than 20 m$^2$/g, the activity reduces in a certain case, and when it exceeds 1000 m$^2$/g, the polymer is reduced in a bulk density in a certain case. In the catalyst used for producing the 1-butene base polymers, an amount of the transition metal contained in 100 g of the carrier is usually 0.05 to 10 g, particularly preferably 0.1 to 2 g. When the amount of the transition metal falls outside of the range described above, the activity reduces in a certain case.

An industrially advantageous polymer having a high bulk density and an excellent particle diameter distribution can be obtained by being carried on the carrier in the manner described above.

The 1-butene base polymer used in the present invention is produced by homopolymerizing 1-butene or copolymerizing 1-butene with ethylene and/or α-olefins having 3 to 20 carbon atoms (excluding 1-butene) in the presence of the catalyst for polymerization described above.

In this case, the polymerizing method shall not specifically be restricted, and any of a slurry polymerizing method, a gas phase polymerizing method, a bulk polymerizing method, a solution polymerizing method and a suspension polymerizing method may be used. The slurry polymerizing method and the gas phase polymerizing method are particularly preferred.

In respect to the polymerizing conditions, the polymerizing temperature is usually −100 to 250° C., preferably −50 to 200° C. and more preferably 0 to 130° C. In respect to a use proportion of the catalyst to the reaction raw material, the raw material monomer/the component (A) described above (mole ratio) is preferably 1 to $10^8$, particularly preferably 100 to $10^5$. The polymerizing time is usually 5 minutes to 10 hours, and the reacting pressure is preferably an atmospheric pressure to 20 MPa (gauge), more pressure to 10 MPa (gauge).

A method for controlling a molecular weight of the polymer includes selection of the kind of the respective catalyst components, the use amount and the polymerizing temperature and polymerization in the presence of hydrogen.

When, using a polymerizing solvent, capable of being employed are aromatic hydrocarbons such as benzene, toluene, xylene and ethylbenzene, alicyclic hydrocarbons such as cyclopentane, cyclohexane and methylcyclohexane, aliphatic hydrocarbons such as pentane, hexane, heptane and octane and halogenated hydrocarbons such as chloroform and dichloromethane. These solvents may be used alone or in combination of two or more kinds thereof. Further, a monomer such as α-olefin may be used as the solvent. The polymerization can be carried out without using the solvent depending on the polymerizing method.

In polymerizing, preliminary polymerization can be carried out using the catalyst for polymerization described above. Bringing the solid catalyst component into contact with a small amount of olefin can carry out the preliminary polymerization. A method thereof shall not specifically be restricted, and a publicly known method can be used. The olefin used for the preliminary polymerization shall not specifically be restricted, and examples include the same ones as those described as the examples described above, for example, ethylene, α-olefins, having 3 to 20 carbon atoms and a mixture thereof. The same olefin as the olefin used in the above polymerization is advantageously used.

The preliminary polymerization temperature is usually −20 to 200° C., preferably −10 to 130° C. and more preferably 0 to 80° C. In the preliminary polymerization, aliphatic hydrocarbons, aromatic hydrocarbons and the monomers can be used as a solvent. Among them, the aliphatic hydrocarbons are particularly preferred. The preliminary polymerization may be carried out without using the solvent.

In the preliminary polymerization, the conditions are preferably controlled so that a limiting viscosity [η] (measured in decalin at 135° C.) of the preliminary polymerization product is 0.2 deciliter/g or more, particularly 0.5 deciliter/g or more and an amount of the preliminary polymerization product per millimole of the transition metal component contained in the catalyst is 1 to 10000 g, particularly 10 to 1000 g.

[3] Polyolefin Base Resin Composition (A)

The polyolefin base resin composition (A) of the present invention comprises [I] the 1-butene base polymer described above in an amount of 1 to 99% by weight, [II] the propylene base resin in an amount of 99 to 1% by weight and the nucleus-forming agent in an amount of 10 ppm or more, and a weight ratio of [I] 1-butene base polymer/[II] propylene base resin is preferably 10/90 to 90/10, more preferably 10/90 to 60/40.

The [II] propylene base resin includes homopolypropylene which is a polymer of only propylene, for example, random polypropylene of propylene-ethylene, for example, block polypropylene of propylene/propylene-ethylene. Further, [5] a crystalline propylene base polymer, which shall be described later, can be used as well.

The [II] propylene base resin in the present invention has a weight average molecular weight of usually 10,000 to 1,000,00 from the viewpoint of practicality, as is the case with the 1-butene base polymers.

In general, crystallization of the 1-butene base polymer comprises two steps of a crystalline nucleus-forming step and a crystal-growing step, and it is said that in the crystalline nucleus-forming step, a temperature difference from the crystallization temperature and the situation of alignment in a molecular chain exert an effect on a crystalline nucleus-forming rate thereof. It is known that particularly when present is a substance having an effect of promoting molecular chain alignment via adsorption of the molecular chain, the crystalline nucleus-forming rate is notably increased. The nucleus-forming agent used in the present invention may be any one as long as it has an effect of raising a progressing rate of the crystalline nucleus-forming step. The substance having an effect of raising a progressing rate of the crystalline nucleus-forming step includes substances having an effect of promoting molecular chain alignment via adsorption of a molecular chain of a polymer.

The specific examples of the nucleus-forming agent described above include high melting polymers, organic carboxylic acids or metal salts thereof, aromatic sulfonic acid salts or metal salts thereof, organic phosphoric acid compounds or metal salts thereof, dibenzylidenesorbitol or derivatives thereof, rosin acid partial metal salts, inorganic fine particles, imides, amides, quinacridones and quinones or mixtures thereof.

These nucleus-forming agents may be used alone or in combination of two or more kinds thereof.

The high melting polymers include polyolefins such as poly(3-methylpentene-1) and poly(3-methylbutene-1), polyvinylcycloalkanes such as polyvinylcyclohexane and polyvinylcyclopentane, syndiotactic polystyrenes and polyalkenylsilanes.

The metal salts include aluminum benzoate, aluminum p-t-butylbenzoate, sodium adipate, sodium thiophenecarboxylate and sodium pyrrolecarboxylate.

A film obtained by molding the polyolefin base resin composition (A) containing dibenzylidenesorbitol or a derivative thereof as the nucleus-forming agent is excellent particularly in transparency and has a great display effect, and therefore it is suited to packaging of toys, stationeries and the like.

Dibenzylidene sorbitol or the derivative thereof includes dibenzylidenesorbitol, 1,3:2,4-bis(o-3,4-dimethylbenzylidene)sorbitol, 1,3:2,4-bis(o-2,4-dimethylbenzylidene)sorbitol, 1,3:2,4-bis(o-4-ethylbenzylidene)sorbitol, 1,3:2,4-bis(o-4-chlorobenzylidene)sorbitol and 1,3:2,4-dibenzylidenesorbitol. To be specific, it includes Gerol MD and Gerol MD-R (brand names) available from Shin Nippon Rika Co., Ltd.

The rosin acid partial metal salts include Pine Crystal KM 1600, Pine Crystal KM 1500 and Pine Crystal KM 1300 (brand names) available from Arakawa Chemical Ind., Ltd.

When the inorganic fine particles of talc and the like are used as the nucleus-forming agent in the polyolefin base resin composition (A) described above, the film molded is excellent in a slipping property and improves in characteristics such as a printing characteristic, and therefore it is preferred.

The inorganic fine particles include talc, clay, mica, asbestos, glass fibers, glass flakes, glass beads, calcium silicate, montmorillonite, bentonite, graphite, aluminum powder, alumina, silica, diatomaceous earth, titanium oxide, magnesium oxide, pumice powder, pumice balloon, aluminum hydroxide, magnesium hydroxide, basic magnesium carbonate, dolomite, calcium sulfate, potassium titanate, barium sulfate, calcium sulfite and molybdenum sulfide.

In the polyolefin base resin composition (A) of the present invention, use of especially an organic phosphoric acid metal salt represented by the following general formula and/or inorganic particles such as talc decreases generation of odor and therefore is preferred. This polyolefin base resin composition (A) is suited to uses for foods. The specific example of the organic phosphoric acid metal salt includes Adekastab NA-11 and Adekastab NA-21 (available from Asahi Denka Co., Ltd.).

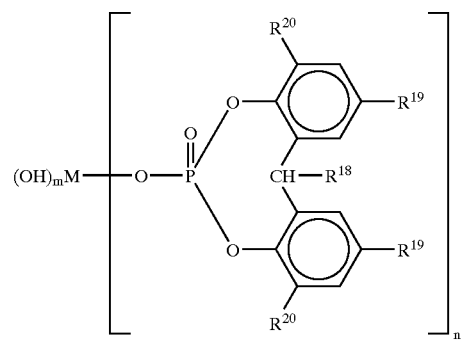

(wherein $R^{18}$ represents a hydrogen atom or an alkyl group having 1 to 4 carbon atoms; $R^{19}$ and $R^{20}$ each represent a hydrogen atom, an alkyl group having 1 to 12 carbon atoms, a cycloalkyl group, an aryl group or an aralkyl group; M represents any of alkaline metal, alkaline earth metal, aluminum and zinc; when M is alkaline metal, m represents 0, and n represents 1; when M is alkaline earth metal or zinc, n represents 1 or 2, wherein when n is 1, m represents 1, and when n is 2, m represents 0; and when M is aluminum, m represents 1, and n represents 2).

A film obtained by molding the polyolefin base resin composition (A) containing an amide compound as the nucleus-forming agent is excellent particularly in rigidity and less liable to cause a problem of winding creases in high speed bag making, and therefore it is suited as a general purpose packaging film in a high speed bag making machine.

The amide compound includes adipic acid dianilide and suberic acid dianilide.

An addition amount of the nucleus-forming agent described above falls in a range of usually 10 ppm or more, preferably 50 to 3000 ppm based on the 1-butene base polymers. When it is less than 10 ppm, the moldability is not improved. On the other hand, even though an added amount of the nucleus-forming agent is increased, the effect corresponding thereto is not obtained in a certain case.

In general, an addition amount of the nucleus-forming agent is preferably, although depending on the kind of the nucleus-forming agent, 1000 ppm or less from the viewpoint of a transparency and an impact resistance of the polyolefin base polymer composition. More specific addition amount is preferably 3000 ppm or less, more preferably 1500 ppm or less and particularly preferably 500 ppm or less in the case of dibenzylidenesorbitol as the nucleus-forming agent. It is preferably 1200 ppm or less in the case of bis(p-methylbenzylidene)sorbitol and bis(dimethylbenzylidene)sorbitol. It is preferably 500 ppm or less, more preferably 250 ppm or less and particularly preferably 125 ppm or less in the case of an organic phosphoric acid Na salt which is the organic phosphoric acid metal salt. It is preferably 1900 ppm or less, more preferably 1500 ppm or less and particularly preferably 500 ppm or less in the case of an organic phosphoric acid Al salt. It is preferably 4000 ppm or less, more preferably 2000 ppm or less and particularly preferably 1000 ppm or less in the case of Talc MMR available from Asada Flour Milling Co., Ltd. as talc. It is preferably 3000 ppm or less, more preferably 1500 ppm or less and particularly preferably 500 ppm or less in the case of Enujester NU-100 available from Shin Nippon Rika Co., Ltd. as the amide base compound.

The production process for the polyolefin base resin composition (A) of the present invention includes a process in which blended are [I] the 1-butene base polymer, [II] the propylene base resin and the nucleus-forming agent each described above and various additives may be used if necessary. Various additives used if necessary include an antioxidant, a neutralizing agent, a slipping agent, an anti-blocking agent, an anticlouding agent and an anti-static agent, etc.

The blending process includes a powder blending process in which blending is carried out by means of a kneading machine and a reactor blending process in which blending is carried out in a polymerization reaction bath. The kneading machine used in the powder blending process includes a Banbury mixer and a double shaft kneading machine. Also, the reactor blending process by which the respective components can sufficiently be blended can be used as well. This reactor blending process includes a multistage polymerization process passing through two or more polymerizing steps and a polymerization process (multistage polymerization) in which a cocatalyst comprising two or more kinds of transition metal compounds is used. In this case, the nucleus-forming agent is added after polymerization.

The multistage polymerization process includes a polymerization process passing through at least a step for producing a 1-butene base polymer, that is, at least a polymerization step using a low regular metallocene catalyst. The low regular metallocene catalyst means a metallocene catalyst giving the 1-butene base polymers described above. To be specific, it includes the catalysts given as the examples of the catalysts for producing the 1-butene base polymers.

Further, the multistage polymerization process includes as well, for example, a multistage successive polymerization process using a Ziegler-Natta catalyst of a high active carrying type and a low regular metallocene catalyst and a multistage successive polymerization process using a high regular metallocene catalyst and a low regular metallocene catalyst.

The Ziegler-Natta catalyst of a high active carrying type is preferably a Ziegler-Natta catalyst of a high active carrying type that provides polypropylene having a mesopentad ratio (mmmm) exceeding 60 mole %. The high regular metallocene catalyst is preferably a metallocene catalyst that provides polypropylene having a mesopentad ratio (mmmm) exceeding 60 mole %. The high regular metallocene catalyst includes transition metal compounds having at least one of a cyclopentadienyl group, a substituted cyclopentadienyl group, an indenyl group and a substituted indenyl group as a ligand and catalysts obtained by combining promoters with transition metal compounds in which the above ligands are geometrically controlled, which are described in Japanese Patent Application Laid-Open No. 19309/1983, Japanese Patent Application Laid-Open No. 130314/1986, Japanese Patent Application Laid-Open No. 163088/1991, Japanese Patent Application Laid-Open No. 300887/1992, Japanese Patent Application Laid-Open No. 21694/1992 and Japanese Patent Application Laid-Open (through PCT) No. 502036/1989.

Further, the polymerization process using a cocatalyst includes a polymerization process using a cocatalyst in which at least one component comprises a low regular metallocene catalyst. It includes, for example, a polymerization process using a cocatalyst comprising a high regular metallocene catalyst and a low regular metallocene catalyst. The cocatalyst may be carried. It includes, for example, a polymerization process using a co-carrying catalyst obtained by carrying a high regular metallocene catalyst and a low regular metallocene catalyst on a carrier. The low regular metallocene catalyst includes the metallocene catalyst described above giving the 1-butene base polymers.

In the case of the polymerization process using a cocatalyst as the production process for the above polyolefin base resin composition (A), the polymerization process using a co-carrying catalyst is preferred.

[4] Film

The film of the present invention is a film obtained by molding the polyolefin base resin composition (A) described above. The film of the present invention is characterized by that it is excellent in transparency and flexibility and has a large crystal-stabilizing rate, and it is less sticky and excellent in a low temperature impact resistance.

Uses of the film of the present invention include a film for packaging foods and an agricultural film.

When the polyolefin base resin-molded article of the present invention is a packaging material such as a film and a sheet, it is excellent in a low temperature heat-sealing property and has a wide heat-sealing temperature range and an excellent hot tacking property.

The polyolefin base resin film (including the sheet) of the present invention has a thickness of usually 1 $\mu$m to 1 cm, and the above film has preferably an elastic modulus TM of 6 MPa or more. When the elastic modulus TM of the film is less than 6 MPa, the film is liable to be sticky.

In respect to a relation between the elastic modulus TM (MPa) of the film and the heat sealing temperature HST (° C.), a relation between the elastic modulus TM (MPa) of the film and the heat sealing temperature $HST^1$ (° C.) measured after leaving (called aging) the film standing at a room temperature for a whole day and night in accordance with JIS Z-1707 satisfies the equation of "$TM \geq 12.5 \times HST^1 - 1100$", preferably satisfies the equation of "$TM \geq 12.5 \times HST^1 - 1050$" and more preferably satisfies the equation of "$TM \geq 12.5 \times HST^1 - 1000$". When the relation between TM and $HST^1$ deviates from the above range, the secondary processing rate is reduced.

A relation between the heat sealing temperature $HST^1$ (° C.) measured after aging for a whole day and night and the aged heat sealing temperature $HST^{30}$ (° C.) measured after aging for 30 days is preferably satisfies the equation of "$HST^3 - HST^1 \leq 5$", more preferably satisfies the equation of "$HST^3 - HST^1 \leq 3$". In the case of "$HST^3 - HST^1 > 5$", the heat sealing temperature varies to a large extent with the passage of time, and therefore poor sealing grows in secondary processing in a certain case.

Further, the larger film impact strength is more preferred, and it is preferably 5000 J/m or more, more preferably 8000 J/m or more in an evaluating method described later.

When the film of the present invention is produced, it can be produced by a conventional compression molding method and extrusion molding method.

The film obtained by molding the polyolefin base resin composition (A) of the present invention may be or may not be stretched. When it is stretched, biaxial stretching is preferred. The conditions of biaxial stretching include the following conditions:

(1) Molding condition in molding a sheet
  Resin temperature: 50 to 200° C.
  Chilled roll temperature: 50° C. or lower
(2) Longitudinal stretching condition
  Stretching magnification: 3 to 7 times
  Stretching temperature: 50 to 100° C.
(3) Lateral stretching condition
  Stretching magnification: 6 to 12 times
  Stretching temperature: 50 to 100° C.

The film obtained by molding the polyolefin base resin composition (A) of the present invention may be treated, if necessary, on a surface thereof to increase a surface energy and polarize a surface. The treating method includes, for example, corona discharge treatment, chromic acid treatment, flame treatment, hot air treatment, ozone treatment and UV ray irradiating treatment. A roughening method of the surface includes, for example, a sand blast method and a solvent treating method.

The film obtained by molding the polyolefin base resin composition (A) of the present invention can be blended, if necessary, with an antioxidant, a neutralizing agent, a slipping agent, an anti-blocking agent, an anticlouding agent or an anti-static agent which is ordinarily used.

The film obtained by blending the polyolefin base resin composition (A) of the present invention with inorganic particles of talc and the like and molding it is excellent as well in a slipping property and therefore improved in a secondary processability such as bag making and printing, and it is suited to every general purpose packaging film in a high speed manufacturing machine such as various automatic filling and packaging laminates.

A multilayer film can be produced as well from the polyolefin base resin composition (A) according to the present invention. A process for producing a polyolefin base resin multilayer laminate shall not specifically be restricted and includes, for example, a process for producing it by a melt co-extrusion molding method. Especially, particularly preferred is a T die cast molding method by which high speed molding can be carried out by means of a large molding machine. The drawing speed may be a high-speed film-forming condition of usually 50 m/minute or more. A thickness of the multilayer laminate shall not specifically be restricted, and it is usually in an extent of 10 to 5000 μm.

In this multilayer laminate, the polyolefin base resin composition (A) can be used for an outermost layer or an intermediate layer.

[5] Crystalline Polypropylene Base Polymer

The [II] crystalline propylene base polymer constituting the polyolefin resin composition (B) in the multilayer laminate of the present invention shall not specifically be restricted as long as it is a propylene base polymer showing crystallinity. When it does not show crystallinity, the film and the sheet shall be reduced in a heat resistance in a certain case.

The [II] crystalline propylene base polymer includes, for example, a propylene homopolymer, a propylene-ethylene random copolymer, a propylene-ethylene-1-butene random copolymer and a propylene-ethylene block copolymer.

A molecular weight of [II] the crystalline propylene base polymer is selected from the viewpoint of moldability in any cases. The polymer having a melt index of 2 to 20 g/10 minute is preferred for molding a T die cast film, and the polymer having a melt index t of 1 to 10 g/10 minute is preferred for molding a sheet. The polymer can optionally be selected from them according to the intended uses of the film and the sheet.

As the specific examples of [II] the crystalline propylene base polymer, a propylene base homopolymer having a high melting point and a high crystallinity is preferred for uses in which the heat resistance and the heat sealing strength are regarded as important, and those described in Japanese Patent Application Laid-Open No. 85711/1996 can be nominated as the example thereof.

That is, [II] the crystalline propylene base polymer in the present invention includes a propylene base polymer satisfying:

(1) An isotactic pentad ratio (P) which is a stereospecific index being 85.0 to 92.0 mole %; an amount (H) of n-heptane-insoluble part being 98.0 to 97.0% by weight; and a relation between P and H satisfies an equation of:

$$0.750P + 27.125 < H; \text{ and}$$

(2) a melt index (MI) being 1 to 20 g/10 minute, and a relation between a relaxation time τ (sec) at a frequency $\omega^0 = 10^0$ rad/sec obtained by frequency dispersion measurement at a temperature of 175° C. and MI satisfies an equation of:

$$\tau \leq 0.65 - 0.025 \text{ MI}.$$

More preferably, (1') An isotactic pentad ratio (P) which is a stereospecific index being 85.0 to 92.0 mole %; an amount (H) of n-heptane-insoluble part being 86.0 to 97.0% by weight; and a relation between P and H satisfies an equation of:

$$0.750P + 26.000 < H; \text{ and}$$

(2') a melt index (MI) being 1 to 25 g/10 minute, and a relation between a relaxation time τ (sec) at a frequency $\omega^0 = 10^0$ rad/sec obtained by frequency dispersion measurement at a temperature of 175° C. and MI satisfies an equation of:

$$\tau \leq 0.63 - 0.025 \text{ MI}.$$

The meanings and the measuring methods of P, H, MI, $\omega^0$ and τ each described above and the production process for the propylene base polymer are described in Japanese Patent Application Laid-Open No. 85711/1996.

When the film and the sheet are improved in a low temperature heat sealing property, [II] the crystalline propylene base polymer is preferably a propylene-ethylene random copolymer and a propylene-ethylene-1-butene random copolymer which are excellent in a low temperature heat sealing property, the examples thereof are those described in Japanese Patent Application Laid-Open No. 208629/1997, Japanese Patent Application Laid-Open No. 272718/1997 and Japanese Patent Application Laid-Open No. 130336/1998.

Among them, a propylene base copolymer that is a copolymer of propylene and ethylene and satisfies following (a) to (e) can be given as suited for [II] the crystalline propylene base polymer in the present invention (Japanese Patent Application Laid-Open No. 208629/1997):

(a) An ethylene unit in the copolymer has a content χ (wt %) of 3 to 10 wt %;

(b) the copolymer has a melt index MI (g/10 minute) of 4 to 12 g/10 minute;

(c) a boiling diethyl ether-extracted amount E (wt %) and χ satisfy a relation of an equation (I) or (II):

$$E \leq 0.25\chi + 1.1 \ (\chi = 3 \text{ to } 6 \text{ wt \%}) \tag{I},$$

$$E \leq 0.26 \ (\chi = 6 \text{ to } 10 \text{ wt \%}) \tag{II};$$

(d) a melting point Tm (° C.) measured by means of a differential scanning type calolimeter and χ satisfy a relation of an equation (III) or (IV):

$$Tm \leq 140 \ (\chi = 3 \text{ to } 5 \text{ wt \%}) \tag{III},$$

$$Tm \leq 165 - 5\chi \ (\chi = 5 \text{ to } 10 \text{ wt \%}) \tag{IV}; \text{ and}$$

(e) an isotactic triad ratio mm (mole %) of a PPP chain part measured by means of $^{13}$C-NMR is 98.0 mole % or more.

Or, [II] the crystalline polypropylene base polymer in the present invention includes a propylene base random copolymer which is a random copolymer of propylene and ethylene and satisfies following (f) to (j) (Japanese Patent Application Laid-Open No. 272718/1997):

(f) An ethylene unit in the copolymer has a content $\chi$ (wt %) of 0.2 to 4 wt %;

(g) the copolymer has a melt index MI (g/10 minute) of 4 to 12 g/10 minute;

(h) a boiling diethyl ether-extracted amount E (wt %) and $\chi$ satisfy a relation of an equation (1):

$$E \leq 0.25\chi + 1.1 \tag{1};$$

(i) a melting point Tm (° C.) measured by means of a differential scanning type calolimeter and $\chi$ satisfy a relation of an equation (2):

$$Tm \leq 165 - 5\chi \tag{2}; \text{ and}$$

(j) an isotactic triad ratio mm (mole %) of a PPP chain part measured by means of $^{13}$C-NMR is 98.0 mole % or more.

Next, the ethylene/1-butene/propylene copolymer includes a copolymer described in Japanese Patent Application Laid-Open No. 60639/1999.

That is, it is a propylene base copolymer which is a copolymer of propylene, ethylene and 1-butene and which satisfies following (k) to (p):

(k) A content $\alpha$ (mol %) of an ethylene unit and a content $\beta$ (mol %) of a 1-butene unit in the copolymer satisfies an equation (3):

$$4 \leq \alpha + \beta \leq 15 \tag{3};$$

(l) the copolymer has a melt index MI (g/10 minute) of 1 to 12 g/10 minute;

(m) a boiling diethyl ether-extracted amount E (wt %) and ($\alpha+\beta$) satisfy a relation of an equation (4) in the case of ($\alpha+\beta$)$\leq$12 and an equation (5) in the case of ($\alpha+\beta$)>12:

$$E \leq 0.2(\alpha+\beta) + 0.6 \tag{4},$$

$$E \leq 3.0 \tag{5};$$

(n) a melting point Tm (° C.) measured by means of a differential scanning type calolimeter and ($\alpha+\beta$) satisfy a relation of an equation (6):

$$Tm \leq 164 - 3.6(\alpha+\beta) \tag{6};$$

(o) a stereospecific index P (mole %) measured by means of $^{13}$C-NMR is 98 mole % or more; and (p) a ratio (Mw/Mn) of a weight average molecular weight (Mw) to a number average molecular weight (Mn) which are measured by gel permeation chromatography (GPC) is 6 or less.

The meanings and the measuring methods of the respective parameters and the production processes for the respective polymers are described in the foregoing prior art references respectively.

[6] Polyolefin Resin Composition (B)

The polyolefin resin composition (B) constituting the outermost layer of the multilayer laminate of the present invention may be prepared by dry-blending [I] the 1-butene base polymer and [II] the crystalline polypropylene base polymer each described above by means of a Henschel mixer or melting and kneading them by means of a single shaft or double shaft extruding machine or a Banbury mixer.

In respect to the blending proportion, [I] the 1-butene base polymer accounts for usually 1 to 99% by weight, preferably 10 to 90% by weight and particularly preferably 20 to 80% by weight. When [I] the 1-butene base polymer accounts for less than 1% by weight, the flexibility reduces in a certain case.

In respect to a heat-sealing strength of the polyolefin resin composition (B), a relation between the heat sealing temperature HST (° C.) and the hot tacking temperature TH (° C.) satisfies preferably the following equation:

$$TH < 1.29 \times HST - 54.5.$$

When this equation is not satisfied, the satisfactory performances are not obtained in a certain case in terms of high-speed bag making and the heat-sealing strength.

The measuring methods of the heat-sealing temperature HST and the hot tacking temperature TH shall be explained in Examples described later.

In the polyolefin resin composition (B), the H25 described above is preferably 0 to 25% by weight, more preferably 0 to 10% by weight. When the H25 exceeds 25% by weight, an amount of the sticky component increases, and therefore blocking is reduced, so that it is not used for applications of foods and medical goods in a certain case.

The H25 of the polyolefin resin composition (B) can be calculated in the same manner as in the 1-butene base polymers described above.

Various additives may be added, if necessary, to the above polyolefin resin composition (B) Various additives used if necessary include, for example, antioxidants, neutralizing agents, slipping agents, anti-blocking agents, anticlouding agents and anti-static agents. These additives may be used alone or in combination of two or more kinds thereof. The antioxidants include, for example, phosphorus base antioxidants, phenol base antioxidants and sulfurs base antioxidants.

The specific examples of the phosphorus base antioxidants include trisnonylphenyl phosphite, tris(2,4-di-t-butylphenyl) phosphite, distearypentaerythritol diphosphite, bis(2,4-di-t-butylphenyl)pentaerythritol phosphite, bis(2,6-di-t-butyl-4-methylphenyl)pentaerythritol phosphite, 2,2-methylenebis(4,6-di-t-butylphenyl)octyl phosphite, tetrakis (2,4-di-t-butylphenyl)-4,4-biphenylene-di-phosphite, Adekastab 1178 (available from Asahi Denka Co., Ltd.), Sumilizer TNP (available from Sumitomo Chemical Ind. Co., Ltd.), JP-135 (available from Johoku Chemical Co., Ltd.), Adekastab 2112 (available from Asahi Denka Co., Ltd.), JPP-2000 (available from Johoku Chemical Co., Ltd.), Weston 618 (available from GE Corporation), Adekastab PEP-24G (available from Asahi Denka Co., Ltd.), Adekastab PEP-36 (available from Asahi Denka Co., Ltd.), Adekastab HP-10 (available from Asahi Denka Co., Ltd.), Sandstab P-EPQ (available from Sand Co., Ltd.) and Phosphite 168 (available from Ciba Geigy Co., Ltd.).

The specific examples of the phenol base antioxidants include 2,6-di-t-butyl-4-methylphenol, n-octadedecyl-3-(3', 5'-di-t-butyl-4'-hydroxyphenyl)propionate, tetrakis [methylene-3-(3,5-di-t-butyl-4-hydroxyphenyl)propionate] methane, tris(3,5-di-t-butyl-4-hydroxybenzyl)isocyanurate, 4,4'-butylidenebis-(3-methyl-6-t-butylphenol), triethylene glycol-bis[3-(3-t-butyl-4-hydroxy-5-methylphenyl) propionate], 3,9-bis{2-[3-t-butyl-4-hydroxy-5-methylphenyl]propionyloxy}-1,1-dimethylethyl}-2,4,8,10-tetraoxaspiro[5,5]undecane, Sumilizer BHT (manufactured by Sumitomo Chemical Ind. Co., Ltd.), Yoshinox BHT (available from Yoshino Seiyaku Co., Ltd.), Antage BHT (available from Kawaguchi Chemical Co., Ltd.), Irganox 1076 (available from by Ciba Geigy Co., Ltd.), Irganox 1010 (available from by Ciba Geigy Co., Ltd.), Adekastab AO-60 (available from Asahi Denka Co., Ltd.), Sumilizer BP-101

(available from Sumitomo Chemical Ind. Co., Ltd.), Tominox TT (available from Yoshino Seiyaku Co., Ltd.), TTHP (available from Toray Corporation), Irganox 3114 (available from Ciba Geigy Co., Ltd.), Adekastab AO-20 (available from Asahi Denka Co., Ltd.), Adekastab AO-40 (available from Asahi Denka Co., Ltd.), Sumilizer BBM-S (available from Sumitomo Chemical Ind. Co., Ltd.), Yoshinox BB (available from Yoshino Seiyaku Co., Ltd.), Antage W-300 (available from Kawaguchi Chemical Co., Ltd.), Irganox 245 (available from Ciba Geigy Co., Ltd.), Adekastab AO-70 (available from Asahi Denka Co., Ltd.), Tominox 917 (available from Yoshino Seiyaku Co., Ltd.) and Sumilizer GA-80 (available from Sumitomo Chemical Ind. Co., Ltd.).

The specific examples of the sulfur base antioxidants include dilauryl-3,3'-thiodipropionate, dimyristyl-3,3'-thiodipropionate, distearyl-3,3'-thiodipropionate, pentaerythritoltetrakis(3-laurylpropionate), Sumilizer TPL (available from Sumitomo Chemical Ind. Co., Ltd.), Yoshinox DLTP (available from Yoshino Seiyaku Co., Ltd.), Antinox L (available from Nippon Oil & Fat Co., Ltd.), Sumilizer TPM (available from Sumitomo Chemical Ind. Co., Ltd.), Yoshinox DMTP (available from Yoshino Seiyaku Co., Ltd.), Antinox M (available from Nippon Oil & Fat Co., Ltd.), Sumilizer TPS (available from Sumitomo Chemical Ind. Co., Ltd.), Yoshinox DSTP (available from Yoshino Seiyaku Co., Ltd.), Antinox S (available from Nippon Oil & Fat Co., Ltd.), Adekastab AO-412S (available from Asahi Denka Co., Ltd.), SEENOX 412S (available from Sipro Kasei Co., Ltd.) and Sumilizer TDP (available from Sumitomo Chemical Ind. Co., Ltd.).

Particularly preferred as the antioxidants for uses of the film and the sheet are Irganox 1010 [chemical name: pentaerythritoltetrakis[3-(3,5-di-t-butyl-4-hydroxyphenyl) propionate]], Irgafos 168 [chemical name: tris(2,4-di-t-butylphenyl) phosphite], Irganox 1076 [chemical name: octadecyl-3-(3,5-di-t-butyl-4-hydroxyphenyl)propionate], Irganox 1330 [chemical name: 1,4,5-trimethyl-2,4,6-tris(3, 5-di-t-butyl-4-hydroxybenzyl)benzene], Irganox 3114 [chemical name: tris(3,5-di-t-butyl-4-hydroxybenzyl) isocyanurate] and P-EPQ [chemical name: tetrakis(2,4-di-t-butylphenyl)-4,4-biphenylene-di-phosphite].

When the antioxidant is used in the above polyolefin resin composition (B), 0.001 to 1 part by weight of the antioxidant is added to 100 parts by weight of the polyolefin resin composition. This makes it possible to prevent yellowing and therefore is preferred.

The specific use examples of the antioxidants described above include:

| Use Example 1: | Irganox 1010 | 1000 ppm |
| --- | --- | --- |
|  | PEP-Q | 1000 ppm |
| Use Example 2: | Irganox 1076 | 1200 ppm |
|  | PEP-Q | 600 ppm |
|  | Irgafos 168 | 800 ppm |
| Use Example 3: | Irganox 1010 | 400 to 1000 ppm |
|  | Irgafos 168 | 750 to 1500 ppm |

Calcium stearate, zinc stearate, magnesium stearate and hydrotalcite (DHT-4A) (composition General Formula: $Mg_{4.5}Al_2(OH)_{13}CO_3 \cdot 3.5H_2O$) are particularly preferred as the neutralizing agents for uses of the film and the sheet.

SYLYSIA (available from Fuji Silysia Co., Ltd.) of a synthetic silica series and Mizucil (available from Mizusawa Chemical Ind, Ltd.) are particularly preferred as the anti-blocking agents for uses of the film and the sheet.

Rucic acid amide, oleic acid amide, stearic acid amide, behenic acid amide, ethylenebisstearic acid amide, ethylenebisoleic acid amide, stearylerucamide and oleylpalmitoamide are particularly preferred as the slipping agents for uses of the film and the sheet.

When the nucleus-forming agent is used in the polyolefin resin composition (B), an addition amount of the nucleus-forming agent falls in a range of 10 ppm or more, preferably 10 to 10000 ppm, more preferably 10 to 5000 ppm and further preferably 10 to 2500 ppm based on the polyolefin resin composition. When it is less than 10 ppm, the low temperature heat-sealing property is not improved. On the other hand, when the amount exceeding 10000 ppm is added, not only it lacks the preferred effect, but also it causes poor appearance.

The specific examples of the nucleus-forming agent described above include high melting polymers, organic carboxylic acids or metal salts thereof, aromatic sulfonic acids or metal salts thereof, organic phosphoric acids or metal salts thereof, dibenzylidenesorbitl or derivatives thereof, rosin acid partial metal salts, inorganic fine particles, imides, amides, quinacridones and quinones or mixtures thereof.

The high melting polymers include polyolefins such as polyethylene and polypropylene, polyvinylcycloalkanes such as polyvinylcyclohexane and polyvinylcyclopentane, syndiotactic polystyrenes, poly(3-methylpentene-1), poly(3-methylbutene-1) and polyalkenylsilanes.

The metal salts include aluminum benzoate, aluminum p-t-butylbenzoate, sodium adipate, sodium thiophenecarboxylate and sodium pyrrolecarboxylate.

Dibenzylidene sorbitol or the derivative thereof includes dibenzylidenesorbitol, 1,3:2,4-bis(o-3,4-dimethylbenzylidene)sorbitol, 1,3:2,4-bis(o-2,4-dimethylbenzylidene)sorbitol, 1,3:2,4-bis(o-4-ethylbenzylidene)sorbitol, 1,3:2,4-bis(o-4-chlorobenzylidene)sorbitol and 1,3:2,4-dibenzylidenesorbitol. To be specific, it includes Gerol MD and Gerol MD-R (available from Shin Nippon Rika Co., Ltd).

The rosin acid partial metal salts include Pine Crystal KM 1600, Pine Crystal KM 1500 and Pine Crystal KM 1300 (all available from Arakawa Chemical Ind., Ltd).

The inorganic fine particles include talc, clay, mica, asbestos, glass fibers, glass flakes, glass beads, calcium silicate, montmorillonite, bentonite, graphite, aluminum powder, alumina, silica, diatomaceous earth, titanium oxide, magnesium oxide, pumice powder, pumice balloon, aluminum hydroxide, magnesium hydroxide, basic magnesium carbonate, dolomite, calcium sulfate, potassium titanate, barium sulfate, calcium sulfite and molybdenum sulfide.

The amide compound includes adipic acid dianilide and suberic acid dianilide.

The specific examples of the organic phosphoric acid metal salts include Adekastab NA-11 and Adekastab NA-21 (manufactured by Asahi Denka Co., Ltd.).

These nucleus-forming agents may be used alone or in combination of two or more kinds thereof.

If the inorganic fine particles such as talc described above are used as the nucleus-forming agent, a film into which they are molded is excellent in a slipping property and improved in characteristics such as a printing characteristic, and therefore it is preferred. Further, if dibenzylidenesorbitol or the derivative thereof described above is used as the nucleus-forming agent, the film is excellent in transparency, and therefore it is preferred. Further, if the amide compound described above is used as the nucleus-forming agent, the film is excellent in rigidity, and therefore it is preferred.

[7] Multilayer Laminate

The multilayer laminate of the present invention is produced usually by extrusion laminate processing. Typical examples of a substrate for the polyolefin resin composition (A) or (B) as an outermost layer to carry out extrusion laminate processing include resin films or sheets of high density polyethylene, middle or low density polyethylene, polypropylene, polystyrene, nylon 6, copolymerized nylon (nylon 6/nylon 66, nylon 6/nylon 12), polyesters, ethylene-vinyl acetate copolymers, polyvinyl alcohol, ethylene-vinyl alcohol copolymers and polycarbonate, metal foils or metal sheets of aluminum, iron, copper or alloys comprising them as a principal component, cellophane, paper, cloth, woven fabric and nonwoven fabric. In order to improve an adhesive strength between the above polyolefin resin composition (A) or (B) and the foregoing substrate, the surface of the substrate may be subjected, if necessary, to treatment such as corona discharge treatment, flame treatment and ozone treatment or an adhesive may be applied between the above polyolefin resin composition (A) or (B) and the substrate.

Apparatuses of a conventional T die system can be used as an apparatus for carrying out extrusion laminate processing. A thickness of the laminate shall not specifically be restricted, and the thickness corresponding to the purposes may suitably be selected. The polyolefin resin composition (A) or (B) is used for carrying out extrusion laminate processing on at least one surface of the substrate. Without limiting to the case where one layer of the above polyolefin resin composition (A) or (B) is extrusion-laminated on one surface of the substrate, two or more layers thereof may be extrusion-laminated on one surface of the substrate by means of a multilayer T die extruding machine.

In adhering the multilayer laminate, suitably selected and used according to the material and the uses are conventional methods such as wet lamination using an emulsion base adhesive, dry lamination using a reaction curing type adhesive (including lacquer lamination using an adhesive containing a solvent and non-solvent lamination without containing solvent), hot melt lamination using a hot melt type adhesive (including hot lacquer to which a solvent is added and which is used in a hot state) constituted from a petroleum base wax, an ethylene-vinyl acetate copolymer, an ethylene-acrylic acid copolymer, an ethylene-acrylate copolymer, an ionomer, rigid rubber and a tackifier and sandwich lamination in which a primer layer is provided if necessary and in which lamination is carried out via an adhesive resin molten and extruded.

EXAMPLES

Next, the present invention shall specifically be explained with reference to examples, but the present invention shall by no means be restricted by these examples.

First, the resin characteristics of the 1-butene base polymer and the polyolefin base resin compositions of the present invention and the evaluating methods of the physical properties of the film shall be explained.

[Resin Characteristics of the 1-butene Base Polymer]

(1) Mesopentad Ratio (mmmm), Racemitriad Ratio (rr), Abnormal Insert Amount (1,4 Insert Ratio) and Stereospecific Index {(mmmm)/(mmrr+rmmr)}

They were measured in accordance with the methods described above in the specification by means of JME-EX200 type $^{13}$C-NMR produced by Nippon Electron Co., Ltd.

(2) Weight Average Molecular Weight (Mw) and Molecular Weight Distribution (Mw/Mn)

They were measured in accordance with the methods described above in the specification.

(3) Measurement of H25

It is measured in accordance with the method described above in the specification.

(4) Measurement of DSC (melting Point: Measurement of TmP and TmD, Melt Endothermic Amount: Measurement of ΔH and ΔHD)

They were measured in accordance with the methods described above in the specification by means of DSC-7 produced by Perkin Elmer Co., Ltd. as a differential scanning type calorimeter.

[Evaluation of Physical Properties of Film]

(5) Tensile Elastic Modulus TM (MPa)

It is measured by a tensile test in accordance with JIS K-7127 under the following conditions:

Crosshead speed: 50 mm/minute

Load cell: 15 kg

Measuring direction: machine direction (MD direction)

(6) Film Impact

It is evaluated by an impact breaking strength using a ½ inch impact head in a film impact tester produced by Toyo Seiki Mfg. Co., Ltd.

(7) Heat Sealing Temperature HST (° C.)

Measured in accordance with JIS Z-1707.

The fusing conditions shall be shown below. A surface thermometer calibrates a temperature of a heat-sealing bar. After sealing, it is left leaving for a whole day and night (HST$^1$) or 30 days (HST$^{30}$), and then the peeling strength was measured at a room temperature in accordance with a T type peeling method at a peeling speed of 200 mm/minute. The heat-sealing temperature was determined by calculating a temperature at which the peeling strength was 300 g/15 mm from a sealing temperature-peeling strength curve.

Sealing time: 2 seconds

Sealed area: 15×10 mm

Sealing pressure: 0.52 MPa

Sealing temperature: measured at several points so that the heat sealing temperature could be interpolated.

The measurement was carried out in the following manner in the case of a multilayer laminate film. The film was sealed under the following conditions by means of a heat sealing bar calibrated by a surface thermometer and left leaving for a whole day and night, and then the peeling strength (heat sealing strength) was measured at a room temperature in accordance with a T type peeling method at a peeling speed of 200 mm/minute. The heat-sealing temperature was defined by a temperature at which the peeling strength was 300 g/15 mm, and it was determined from the sealing temperature-peeling strength curve by calculation.

Sealing Conditions

Sealed face: metal roll face/metal roll face

Sealed area: 15×10 mm

Sealing pressure: 2.0 kg/cm$^2$

Sealing time: 1 second

Sealing temperature: measured at several points so that the heat sealing temperature could be interpolated.

(8) Hot Tacking Temperature

The hot tacking property was defined by the lowest temperature at which the peeling distance did not exceed 100 mm, wherein two pieces of sheet of the molded films described above which were cut to 40×800 mm were put together on the polyolefin base resin layers themselves, and a load of 60 g was applied to one piece of the sample via a pulley; in such state, heat sealing of a sealing width of 10 mm and a sealing length of 20 mm was carried out under the conditions of a sealing surface pressure of 2.0 kg/cm$^2$ and a sealing time of 1.0 second by means of a hot tacking tester produced by Toyo Seiki Co., Ltd.; the load was allowed to fall at the same time as finishing the sealing to determine the peeling distance observed when left standing until peeling at the heat sealed part completely stopped.

(9) Anti-blocking Property

A metal roll surface of one of the two films was contacted closely to an anti-metal roll surface of the other film on the following conditions, and they were fixed respectively on a jig of 10 cm×10 cm to measure a peeling strength in an area of 10 cm×10 cm by the following tensile test. The smaller the peeling strength is, the more excellent the anti-blocking property is.

| | |
|---|---|
| Close contact conditions: | temperature 60° C., 3 hours load 36 g/cm$^2$, area 10 cm × 10 cm |
| Tensile test: test speed: | 20 mm/minute |
| load cell: | 2 kg |

(10) Internal Haze

Silicon oil (KF56 available from Shin-etsu Silicon Co., Ltd.) was coated on the surface of a test film in order to remove aberration on the surface, and then the internal haze was measured by a test in accordance with JIS K-7105.

Production Example 1

Preparation of Polymerizing Catalyst (1) Production of 2-chlorodimethylsilylindene A three-neck flask of one liter was charged with 50 milliliter of THF (tetrahydrofuran) and 2.5 g (41 millimole) of magnesium under nitrogen flow, and 0.1 milliliter of 2-dibromoethane was added thereto and stirred for 30 minutes to activate magnesium. After stirring, the solvent was drawn out, and 50 milliliter of THF was newly added. A THF solution (200 milliliter) dissolving 5.0 g (25.6 millimole) of 2-bromoindene was dropwise added thereto spending 2 hours. After finishing dropwise adding, the solution was stirred at a room temperature for 2 hours and then cooled down to −78° C., and a THF solution (100 milliliter) dissolving 3.1 milliliter (25.6 millimole) of dichlorodimethylsilane was dropwise added thereto spending one hour. The solution was stirred for 15 hours, and then the solvent was distilled off. The residue was extracted with 200 milliliter of hexane, and then the solvent was distilled off, whereby 6.6 g (24.2 millimole) of 2-chlorodimethylsilylindene was obtained (yield: 94%)

(2) Production of (1,2'-dimethylsilylene)(2,1'-dimethylsilylene)-bis(indene)

A three-neck flask of one liter was charged with 400 milliliter of THF and 8 g of 2-chlorodimethylsilylindene under nitrogen flow and cooled down to −78° C. Dropwise added to this solution was 38.5 milliliter (38.5 millimole) of a THF solution dissolving (1.0 mole/liter) of LiN(SiMe$_3$)$_2$. The solution was stirred at a room temperature for 15 hours, and then the solvent was distilled off to extract the residue with 300 milliliter of hexane. The solvent was distilled off to thereby obtain 2.0 g (6.4 millimole) of (1,2'-dimethylsilylene)(2,1'-dimethylsilylene)-bis(indene) (yield: 33.4%).

(3) Production of (1,2'-dimethylsilylene)(2,1'-dimethylsilylene)-bis(3-trimethylsilylmethylindenyl) zirconium Dichloride Dissolved in 50 milliliter of THF in a Schlenk bottle was 3.0 g (6.97 mmole) of a lithium salt of (1,2'-dimethylsilylene)(2,1'-dimethylsilylene)-bis(indene). The solution was cooled to −78° C., and 2.1 milliliter (14.2 mmole) of iodomethyltrimethylsilane was slowly dropwise added thereto and stirred at a room temperature for 12 hours. Next, the solvent was distilled off, and 50 milliliter of ether was added and washed with a saturated ammonium chloride solution. After separating the solution, the organic phase was dried, and the solvent was removed to obtain 3.04 g (5.88 mmol) of (1,2'-dimethylsilylene)(2,1'-dimethylsilylene)-bis(3-trimethylsilylmethylindene) (yield: 84%)

Next, the Schlenk bottle was charged with 3.04 g (5.88 mmol) of (1,2'-dimethylsilylene)(2,1'-dimethylsilylene)-bis(3-trimethylsilylmethylindene) obtained above and 50 milliliter of ether under nitrogen flow and cooled down to −78° C., and a hexane solution (1.54M, 7.6 milliliter (1.7 mmol)) of n-BuLi was dropwise added thereto. The solution was heated up to a room temperature and stirred for 12 hours, and then ether was distilled off. The resulting solid matter was washed with 40 milliliter of hexane to thereby obtain 3.06 g (5.07 mmol) of a lithium salt in the form of an ether adduct (yield: 73%)

The result obtained by measuring by means of $^1$H NMR (90 MHz, THF-d$_8$) was δ 0.04 (s, 18H, trimethylsilyl); 0.48 (s, 12H, dimethylsilylene); 1.10 (t, 6H, methyl); 2.59 (s, 4H, methylene); 3.38 (q, 4H, methylene), 6.2–7.7 (m, 8H, Ar—H).

The lithium salt obtained under nitrogen flow was dissolved in 50 milliliter of toluene and cooled down to −78° C., and a toluene (20 milliliter) suspension suspending of 1.2 g (5.1 mmol) of zirconium tetrachloride cooled in advance to −78° C. was dropwise added thereto. After dropwise added, the solution was stirred at a room temperature for 6 hours, and the solvent was distilled off from the reaction liquid. The resulting residue was recrystallized from dichloromethane to thereby obtain 0.9 g (1.33 mmole) of (1,2'-dimethylsilylene)(2,1'-dimethylsilylene)-bis(3-trimethylsilylmethylindenyl)zirconium dichloride (yield: 26%).

The result obtained by measuring by means of $^1$H NMR (90 MHz, CDCl$_3$) was δ 0.0 (s, 18H, trimethylsilyl); 1.02, 1.12 (s, 12H, dimethylsilylene); 2.51 (dd, 4H, methylene); 7.1–7.6 (m, 8H, Ar—H).

Production Example 2

Production of 1-butene Base Polymer A

An autoclave of 10 liter, which was dried by heating, was charged with 4 liter of heptane, 2.5 kg of 1-butene, 5 millimole of triisobutylaluminum and 10 millimole of methylaluminoxane, and 0.03 MPa of hydrogen was further introduced thereinto. The temperature was elevated to 60° C. while stirring, and then 10 micromole of (1,2'-dimethylsilylene)(2,1'-dimethylsilylene)-bis(3-trimethylsilylmethylindenyl)zirconium dichloride obtained in Production Example 1 to carry out polymerization for 60 minutes. After finishing the polymerization reaction, the reaction product was dried under reduced pressure to thereby obtain 67 g of a 1-butene homopolymer. Shown below are the results obtained by evaluating the resin characteristics of the 1-butene base polymer A thus obtained.

| | |
|---|---|
| Mesopentad ratio (mmmm): mol % | 74.1 |
| Racemitriad ratio (rr): mol % | 10.9 |
| Abnormal insert amount: mol % | 0 |

-continued

| | |
|---|---|
| (1, 4 insert ratio) | |
| Stereospecific index | 9.1 |
| (mmmm)/(mmrr + rmmr) | |
| Weight average molecular weight (Mw) | $42 \times 10^4$ |
| Molecular weight distribution (Mw/Mn) | 2.0 |
| Melting point (TmD: DSC measurement): °C. | 79 |
| Melt endothermic amount (ΔHD): J/g | 40 |

Production Example 3

Production of 1-butene Base Polymer B

An autoclave of 10 liter, which was dried by heating, was charged with heptane (4 liter), 1-butene (2.6 kg), triisobutylaluminum (10 mmol) and 0.05 MPa of hydrogen. Then, methylaluminoxane (10 mmol) available from Albemarle Co., Ltd. was added thereto, and the temperature was elevated to 50° C. while stirring, followed by adding the complex (1,2'-dimethylsilylene)(2,1'-dimethylsilylene)-bis(3-trimethylsilylmethylindenyl)zirconium dichloride (10 μmol) prepared in Production Example 1. After stirring for 150 minutes, methanol (20 mL) was added thereto to remove the pressure, and then the polymerization solution was dried under reduced pressure to thereby obtain poly(1-butene).

Shown below are the results obtained by evaluating the resin characteristics of the 1-butene base polymer B (1-butene homopolymer) thus obtained.

| | |
|---|---|
| Mesopentad ratio (mmmm): mol % | 77.4 |
| Racemitriad ratio (rr): mol % | 3.7 |
| 90-2 (rr) | 82.6 |
| Abnormal insert amount: mol % | 0 |
| (1, 4 insert ratio) | |
| Comonomer content: mol % | 0 |
| Stereospecific index | 10 |
| (mmmm)/(mmrr + rmmr) | |
| Weight average molecular weight (Mw) | $86 \times 10^4$ |
| Molecular weight distribution (Mw/Mn) | 2.4 |
| Melting point (TmP: DSC measurement): °C. | 70.2 |
| Melt endothermic amount (ΔH): J/g | 11.5 |
| Melting point (TmD: DSC measurement): °C. | 65.4 |
| Melt endothermic amount (ΔHD): J/g | 45.6 |
| H25 | 40 |

Production Example 4

Production of Polypropylene

1) Preparation of Magnesium Compound

A reaction tank (internal volume: 500 liter) equipped with a stirrer was sufficiently replaced with nitrogen gas, and 87.2 kg of ethanol, 640 g of iodine and 6.4 kg of metal magnesium were added thereto to react them while stirring under a refluxing condition until hydrogen gas was not generated from the system, whereby a solid reaction product was obtained. The reaction liquid containing this solid reaction product was dried under reduced pressure to thereby obtain the intended magnesium compound (solid product).

2) Preparation of Solid Catalyst Component

A reaction tank (internal volume: 500 liter) equipped with a stirrer which was sufficiently replaced with nitrogen gas was charged with 30 kg of the magnesium compound described above (not crushed), 150 liter of refined heptane (n-heptane), 4.5 liter of carbon tetrachloride and 5.4 liter of di-n-butyl phthalate. The system was maintained at 90° C., and 144 liter of titanium tetrachloride was added thereto while stirring to react them at 110° C. for 2 hours. Then, the solid component was separated and washed with refined heptane of 80° C. Further, 288 liter of titanium tetrachloride was added thereto and reacted at 110° C. for 2 hours, and then the solid component was sufficiently washed with refined heptane of 80° C. to obtain a solid catalyst component.

3) Pre-treatment

A reaction tank having an internal volume of 500 liter equipped with a stirrer was charged with 230 liter of refined heptane (n-heptane) and fed with 25 kg of the solid catalyst component described above and triethylaluminum and dicyclopentyldimethoxysilane in a proportion of 1.0 mol/mol and 1.8 mol/mol respectively based on a titanium atom contained in the solid catalyst component. Then, propylene was introduced thereinto until a partial pressure of propylene reached 0.03 MPa and reacted at 25° C. for 4 hours. After finishing the reaction, the solid catalyst component was washed several times with refined heptane, and carbon dioxide was further fed, followed by stirring the solution for 24 hours.

4) Main Polymerization

Propylene was introduced into a polymerizing apparatus having an internal volume of 200 liter equipped with a stirrer, and fed thereinto respectively were 3 mmol/kg-propylene of the solid catalyst component subjected to the treatment described above, 4 mmol/kg-propylene of triethylaluminum and 1 mmol/kg-propylene of dicyclopentyldimethoxysilane in terms of a titanium atom contained in the solid catalyst component subjected to the treatment described above. They were reacted at a polymerizing temperature of 80° C. and a polymerizing pressure (whole pressure) of 2.8 MPa·G.

In the present production example, the feeding amount of hydrogen was controlled so that the prescribed molecular weight was obtained. Further, the feeding amount of ethylene was controlled so that the prescribed ethylene content was obtained. Polypropylene (propylene-ethylene copolymer) thus obtained had a melt index of 7.1 g/10 minute. Analysis of a composition of a gas part in the polymerizing apparatus during polymerization resulted in finding that the hydrogen concentration was 3.9 mol %. Further, polypropylene (propylene-ethylene copolymer) had an ethylene content of 3.1 mol %.

Example 1

The 1-butene base polymer A in an amount of 50 parts by weight obtained in Production Example 2 and polypropylene A (F744NP: available from Idemitsu Petrochemical Co., Ltd.) in an amount of 50 parts by weight were blended with the following additives, and the mixture was extruded and palletized by means of a single shaft extruding machine (model TLC35-20: produced by Tsukadajuki Mfg. Co., Ltd.) to obtain pellets of a polyolefin base resin composition (A).

Irganox 1010: 1000 ppm

Irgafos: 500 ppm

DHT-4A: 250 ppm

Calcium stearate: 250 ppm

Erucic acid amide: 250 ppm

Silica base anti-blocking agent: 2000 ppm

Nucleus-forming agent Gerol MD: 1000 ppm

The pellets thus obtained were molded on the following conditions in accordance with a T die cast molding method by means of a 20 mmø T die cast molding machine (model TLC35-20) produced by Tsukadajuki Mfg. Co., Ltd.:

Film thickness: 50 μm
T die temperature: 190° C.
Drawing rate: 5 m/minute
Chilled roll: mirror finished surface
Chilled roll temperature: 30° C.

After forming the film, it was aged at a room temperature for 24 hours, and the physical properties thereof were evaluated. The physical property evaluation results of the film obtained are shown in Table 1.

Comparative Example 1

The same procedure as in Example 1 was carried out, except that in Example 1, the nucleus-forming agent was not added. The physical property evaluation results of the film thus obtained are shown in Table 1.

TABLE 1

|  | Example 1 | Comparative Example 1 |
| --- | --- | --- |
| Tensile elastic modulus TM (MPa) | 350 | 350 |
| Film impact (J/m) | 10000 | 10000 |
| Heat sealing temperature $HST^1$ (° C.) | 88 | 90 |
| $12.5 \times HST^1 - 1100$ ($\leq TM$) | 0 | 25 |
| Aged heat sealing temperature $HST^{30}$ (° C.) | 91 | 96 |
| $HST^{30} - HST^1$ | 3 | 6 |
| Anti-blocking property (N/m$^2$) | 600 | 800 |
| Internal haze (%) | 4 | 5 |

It can be found in Table 1 that since the nucleus-forming agent was not added in Comparative Example 1, a change in the heat-sealing temperature with the passage of time is large, and the anti-blocking property is deteriorated.

Example 2

Production of Polyolefin Resin Composition (B)

The 1-butene base polymer B in an amount of 65 parts by weight obtained in Production Example 3 and the polypropylene B in an amount of 35 parts by weight obtained in Production Example 4 were blended with the following additives, and then the mixture was extruded and palletized by means of the single shaft extruding machine (model TLC35-20: produced by Tsukadajuki Mfg. Co., Ltd.) to obtain pellets.

| Antioxidants | Irganox 1010: | 500 ppm |
| --- | --- | --- |
|  | Irgafos 168: | 1000 ppm |
| Neutralizing agent | calcium stearate: | 1000 ppm |
| Silica base anti-blocking agent: |  | 2300 ppm |
| Slipping agent | erucic acid amide: | 500 ppm |
| Production of film |  |  |

The pellets of the polyolefin resin composition (B) were molded into a film having a film thickness of 30 μm which was subjected to corona discharge treatment on the way by means of a 40 mmø extruding machine (VS40) produced by Tanabe Plastic Co., Ltd. under the conditions of a resin temperature of 200° C. in a T die outlet, a chilled roll temperature of 30° C. and a drawing rate of 20 m/minute.
Production of Multilayer Laminate The film prepared above and an adhesive (AD-308/CAT-8B/ethyl acetate=1/1/3)-coated surface of a stretched nylon film (15 μm×350 mm) which was subjected to internal corona treatment were laminated together by means of a dry extrusion laminator (a drawing rate: 40 m/minute, a chilled roll: 25° C. and a heater roll: 40° C.) produced by Chempack Engineering Co., Ltd. to thereby prepare a multilayer laminate. Evaluation of resin characteristics and physical properties They were evaluated by the evaluating methods described above. The results obtained are shown in Table 2.

Comparative Example 2

A polyolefin base resin composition and a multilayer laminate were obtained in the same manner as in Example 2, except that in Example 2, the polypropylene B obtained in Production Example 4 was replaced for the 1-butene base polymer. The evaluation results of the resin characteristics and the physical properties are shown in Table 2.

TABLE 2

|  | Example 2 | Comparative Example 2 |
| --- | --- | --- |
| Heat sealing temperature (HST) ° C. | 120.6 | 150.7 |
| Hot tacking temperature (TH) ° C. | 80 | 140 |
| $1.29 \times HST - 54.5$ | 101.1 | 140 |
| H25 % | 5 | 0 |

Industrial Applicability

The polyolefin base resin composition (A) of the present invention is excellent in a flexibility and an impact resistance and rises in a crystal stabilizing rate, and therefore it provides a molded article having an excellent secondary processability and a film which is excellent in a balance between a rigidity and a heat sealing temperature in heat sealing and which has less change in a heat sealing temperature with the passage of time.

Further, the multilayer laminate of the present invention in which at least one of the outermost layers comprises the polyolefin resin composition (B) has an excellent hot tacking property although having a low heat-sealing temperature.

Accordingly, the multilayer laminate of the present invention is excellent in a processability and can advantageously be used for a packaging film.

What is claimed is:

1. A polyolefin base resin composition (A) comprising [I] a 1-butene base polymer in an amount of 1 to 99% by weight, [II] a propylene base resin in an amount of 99 to 1% by weight and a nucleus-forming agent in an amount of 10 ppm or more, wherein [I] the 1-butene base polymer satisfies the following requirements (1) to (4):

(1) it is a crystalline resin having a melting point (TmD) of 0 to 100° C. defined as a peak top in a peak observed at the highest temperature side in a melt endothermic curve which is obtained by holding a sample at −10° C. for 5 minutes under a nitrogen atmosphere by means of a differential scanning type calorimeter (DSC) and then elevating the temperature at a rate of 10° C./minute;

(2) a stereospecific index [(mmmm)/(mmrr+rmmr)] is 20 or less;

(3) a molecular weight distribution (Mw/Mn) determined by gel permeation chromatograph (GPC) is 4.0 or less; and (4) a weight average molecular weight (Mw) determined by GPC is 10,000 to 1,000,000.

2. A film obtained by molding the polyolefin base resin composition (A) as described in claim 1.

3. The film as described in claim 2 satisfying the following requirements (1) to (2):

(1) a relation between a tensile elastic modulus TM (MPa) of the film and a heat sealing temperature $HST^1$ (° C.) measured about the film after aging for a whole day and night in accordance with JIS Z-1707 satisfies the following equation:

$$TM \geq 12.5 \times HST^1 - 1100; \text{ and}$$

(2) a relation between the heat sealing temperature $HST^1$ (° C.) measured about the film after aging for a whole day and night and an aged heat sealing temperature $HST^{30}$ (° C.) measured about the film after aging for 30 days satisfies the following equation:

$$HST^{30} - HST^1 \leq 5.$$

4. A multilayer laminate obtained by laminating the polyolefin base resin composition (A) as described in claim 1, on at least one surface of a substrate.

5. A multilayer laminate obtained by laminating a polyolefin resin composition (B), on at least one surface of a substrate, wherein the multilayer laminate has at least one of an outermost layer which comprises the polyolefin resin composition (B) comprising [I] a 1-butene base polymer in an amount of 1 to 99% by weight and [II] a crystalline propylene base resin in an amount of 99 to 1% by weight, wherein [I] the 1-butene base polymer satisfies the following requirements (1) to (4):

(1) it is a crystalline resin in which a melting point (TmP) defined as a peak top in a peak observed at the highest temperature side in a melt endothermic curve, which is obtained by holding a sample at 190° C. for 5 minutes under a nitrogen atmosphere by means of a differential scanning type calorimeter (DSC), lowering the temperature down to −10° C. at a rate of 5° C./minute to hold at −10° C. for 5 minutes and then elevating the temperature at a rate of 10° C./minute, is not observed or within 0 to 100° C.;

(2) a stereospecific index [(mmmm)/(mmrr+rmmr)] is 20 or less;

(3) a molecular weight distribution (Mw/Mn) determined by gel permeation chromatograph (GPC) is 4.0 or less; and (4) a weight average molecular weight (Mw) determined by GPC is 10,000 to 1,000,000.

6. The multilayer laminate as described in claim 5, wherein [I] the 1-butene base polymer is a 1-butene homopolymer, and the above homopolymer satisfies the following requirements (5) and (6):

(5) a mesopentad ratio (mmmm) is 20 to 90%; and (6) (mmmm) $\leq$ 90−2×(rr);

provided that rr represents a racemitriad ratio.

7. The multilayer laminate as described in claim 5, wherein the polyolefin resin composition (B) in at least one of the outermost layers satisfies the following equation:

$$TH < 1.29 \times HST - 54.5;$$

provided that TH represents a hot tacking temperature (° C.) and HST represents a heat sealing temperature (° C.).

8. The multilayer laminate as described in claim 6, wherein the polyolefin resin composition (B) in at least one of the outermost layers satisfies the following equation:

$$TH < 1.29 \times HST - 54.5;$$

provided that TH represents a hot tacking temperature (° C.) and HST represents a heat sealing temperature (° C.).

* * * * *